United States Patent [19]
Grosse et al.

[11] Patent Number: 5,636,294
[45] Date of Patent: Jun. 3, 1997

[54] METHOD AND APPARATUS FOR TRUNCATION OF IMAGES DURING DATA COMPRESSION

[75] Inventors: Debora I. Y. Grosse; Stephen R. Krebs, both of Ann Arbor, Mich.

[73] Assignee: Unisys Corporation, Blue Bell, Pa.

[21] Appl. No.: 288,061

[22] Filed: Aug. 9, 1994

[51] Int. Cl.$^6$ .................................................. G06K 9/36
[52] U.S. Cl. ........................... 382/239; 358/430; 358/431; 348/419
[58] Field of Search ............................ 382/239, 232, 382/245, 246, 250, 251; 358/426, 261.1, 261.2, 430, 433, 431, 427; 348/419

[56] References Cited

U.S. PATENT DOCUMENTS

| | | | |
|---|---|---|---|
| Re. 34,824 | 1/1995 | Morrison et al. | 348/419 |
| 4,051,530 | 9/1977 | Kuroda et al. | 348/419 |
| 4,301,479 | 11/1981 | Fukinuki et al. | 358/431 |
| 4,745,474 | 5/1988 | Schiff | 348/419 |
| 5,040,233 | 8/1991 | Davy et al. | 382/239 |
| 5,063,608 | 11/1991 | Siegel | 382/239 |
| 5,201,013 | 4/1993 | Kumagai | 382/50 |
| 5,201,030 | 4/1993 | Carrie | 395/132 |
| 5,263,100 | 11/1993 | Kim et al. | 382/250 |
| 5,305,398 | 4/1994 | Klein et al. | 382/47 |
| 5,307,426 | 4/1994 | Kanno et al. | 382/50 |
| 5,412,431 | 5/1995 | Vogel | 348/419 |

OTHER PUBLICATIONS

Joan L. Mitchell, "Facsimile Image Coding", National Computer Conference, 1980, pp. 423–426.

Roy Hunter et al., "International Digital Facsimile Coding Standards", *Proceedings of the IEEE*, vol. 68, No. 7, Jul., 1980, pp. 854–867.

William C. Warner, "Compression Algorithms Reduce Digitized Images to Manageable Size", *EDN*, Jun. 21, 1990, pp. 203–212.

*Standardization of Group 3 Facsimile Apparatus for Document Transmission*, CCITT, Recommendations T.4–T.6 (Geneva, 1980, amended at Malaga–Torremolinos, 1984).

*Primary Examiner*—Leo Boudreau
*Assistant Examiner*—Chris Kelley
*Attorney, Agent, or Firm*—Nawrocki, Rooney & Sivertson, P.A.

[57] ABSTRACT

An apparatus for and method of truncating images during data compression. The present invention truncates an image when the memory requirements for the compressed image exceeds a predetermined threshold. However, unlike prior art systems, the present invention contemplates replacing all of the pixels that are eliminated by the truncation process with a series of "0's" thereby "white filling" the truncated portion of the image. The present invention avoids the disadvantages in the prior art by ensuring that the truncated image contains the same number of pixels as a non-truncated image. Further, the data extent of the truncated image may be the same as a non-truncated image. Finally, the resulting images, either non-truncated images or, if necessary, truncated images, may be stored in a preselected memory size.

18 Claims, 17 Drawing Sheets

LINE #

| | |
|---|---|
| 0 | ...0000000000000000000000000... /—14 |
| 1 | ...00000001 1 0001 1 00000000000... /—16 |
| 2 | ...00000001 1 001 1 00000000000... |
| 3 | ...00000001 1 01 1 00000000000... |
| 4 | ...00000001 1 1 1 00000000000... |
| 5 | ...00000001 1 1 1 00000000000... |
| 6 | ...00000001 1 01 1 00000000000... |
| 7 | ...00000001 1 001 1 00000000000... |
| 8 | ...00000001 1 0001 1 00000000000... |
| 9 | ...0000000000000000000000000... /—18 |

FIG. 1

| WHITE CODES | RUN LENGTHS | BLACK CODES |
|---|---|---|
| 00110101 | 0 | 0000110111 |
| 000111 | 1 | 010 |
| 0111 | 2 | 11 |
| 1000 | 3 | 10 |
| 1011 | 4 | 011 |
| 1100 | 5 | 0011 |
| 1110 | 6 | 0010 |
| 1111 | 7 | 00011 |
| 10011 | 8 | 000101 |
| 10100 | 9 | 000100 |
| 00111 | 10 | 0000100 |
| 01000 | 11 | 0000101 |
| 001000 | 12 | 0000111 |
| 000011 | 13 | 00000100 |
| 110100 | 14 | 00000111 |
| 110101 | 15 | 000011000 |
| 101010 | 16 | 0000010111 |
| 101011 | 17 | 0000011000 |
| 0100111 | 18 | 0000001000 |
| 0001100 | 19 | 00001100111 |
| 0001000 | 20 | 00001101000 |
| 0010111 | 21 | 00001101100 |
| 0000011 | 22 | 00000110111 |
| 0000100 | 23 | 00000101000 |
| 0101000 | 24 | 00000010111 |
| 0101011 | 25 | 00000011000 |
| 0010011 | 26 | 000011001010 |
| 0100100 | 27 | 000011001011 |
| 0011000 | 28 | 000011001100 |
| 00000010 | 29 | 000011001101 |
| 00000011 | 30 | 000001101000 |
| 00011010 | 31 | 000001101001 |
| 00011011 | 32 | 000001101010 |
| 00010010 | 33 | 000001101011 |
| 00010011 | 34 | 000011010010 |
| 00010100 | 35 | 000011010011 |
| 00010101 | 36 | 000011010100 |
| 00010110 | 37 | 000011010101 |
| 00010111 | 38 | 000011010110 |
| 00101000 | 39 | 000011010111 |
| 00101001 | 40 | 000001101100 |
| 00101010 | 41 | 000001101101 |
| 00101011 | 42 | 000011011010 |
| 00101100 | 43 | 000011011011 |
| 00101101 | 44 | 000001010100 |
| 00000100 | 45 | 000001010101 |
| 00000101 | 46 | 000001010110 |
| 00001010 | 47 | 000001010111 |
| 00001011 | 48 | 000001100100 |
| 01010010 | 49 | 000001100101 |
| 01010011 | 50 | 000001010010 |
| 01010100 | 51 | 000001010011 |
| 01010101 | 52 | 000000100100 |
| 00100100 | 53 | 000000110111 |
| 00100101 | 54 | 000000111000 |
| 01011000 | 55 | 000000100111 |
| 01011001 | 56 | 000000101000 |
| 01011010 | 57 | 000001011000 |
| 01011011 | 58 | 000001011001 |
| 01001010 | 59 | 000000101011 |
| 01001011 | 60 | 000000101100 |
| 00110010 | 61 | 000001011010 |
| 00110011 | 62 | 000001100110 |
| 00110100 | 63 | 000001100111 |

FIG. 2

MAKE-UP CODES

| WHITE CODES | RUN LENGTHS | BLACK CODES |
|---|---|---|
| 11011 | 64 | 0000001111 |
| 10010 | 128 | 000011001000 |
| 010111 | 192 | 000011001001 |
| 0110111 | 256 | 000001011011 |
| 00110110 | 320 | 000000110011 |
| 00110111 | 384 | 000000110100 |
| 01100100 | 448 | 000000110101 |
| 01100101 | 512 | 0000001101100 |
| 01101000 | 576 | 0000001101101 |
| 01100111 | 640 | 0000001001010 |
| 011001100 | 704 | 0000001001011 |
| 011001101 | 768 | 0000001001100 |
| 011010010 | 832 | 0000001001101 |
| 011010011 | 896 | 0000001110010 |
| 011010100 | 960 | 0000001110011 |
| 011010101 | 1024 | 0000001110100 |
| 011010110 | 1088 | 0000001110101 |
| 011010111 | 1152 | 0000001110110 |
| 011011000 | 1216 | 0000001110111 |
| 011011001 | 1280 | 0000001010010 |
| 011011010 | 1344 | 0000001010011 |
| 011011011 | 1408 | 0000001010100 |
| 010011000 | 1472 | 0000001010101 |
| 010011001 | 1536 | 0000001011010 |
| 010011010 | 1600 | 0000001011011 |
| 011000 | 1664 | 0000001100100 |
| 010011011 | 1728 | 0000001100101 |

| RUN LENGTHS | WHITE OR BLACK CODES |
|---|---|
| 1792 | 00000001000 |
| 1856 | 00000001100 |
| 1920 | 00000001101 |
| 1984 | 000000010010 |
| 2048 | 000000010011 |
| 2112 | 000000010100 |
| 2176 | 000000010101 |
| 2240 | 000000010110 |
| 2304 | 000000010111 |
| 2368 | 000000011100 |
| 2432 | 000000011101 |
| 2496 | 000000011110 |
| 2560 | 000000011111 |
| EOL | 000000000001 |

FIG. 3

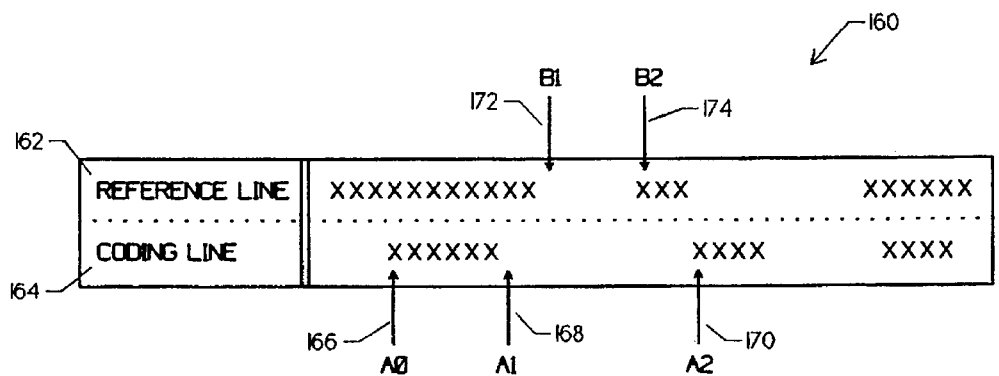
FIG. 5
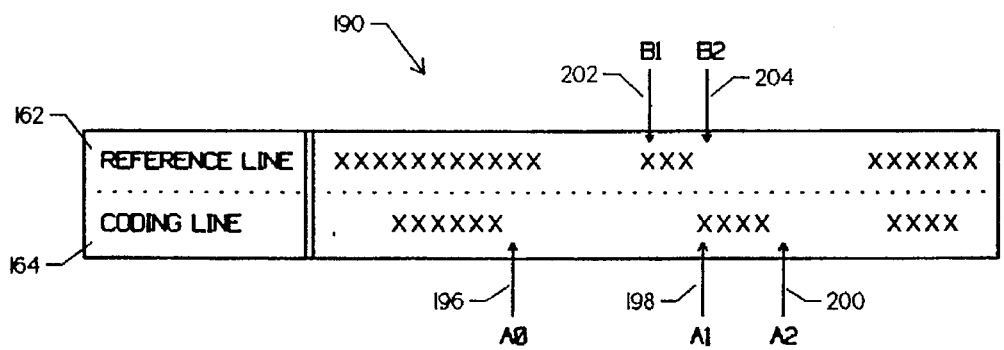
FIG. 6
FIG. 7

METHOD AND APPARATUS FOR TRUNCATION OF IMAGES DURING DATA COMPRESSION

CROSS REFERENCE TO CO-PENDING APPLICATIONS

None.

BACKGROUND OF THE INVENTION

1. Field of the Invention

The present invention generally relates to general purpose digital scanning systems and more particularly relates to such systems that employ data compression as a means for reducing the file size of scanned images for data transmission and/or data storage.

2. Description of the Prior Art

Data compression is popular for reducing the amount of memory required to store digitized images. There are many types of documents which are typically stored as digitized images including engineering drawings, art work, and various other non-textual documents.

Scanners and video cameras can digitize documents thereby coding them as ones and zeros. Digitizing devices may view a document as a large number of pixels wherein each pixel represents a portion of the area of the document and each pixel has a degree of darkness. The degree of darkness of a particular pixel may fall on a light to dark continuum, which represents the grey scale of the pixel. One means of simplifying the process is to eliminate the grey scale wherein the digitizing device assigns a particular pixel a value of zero if the degree of darkness does not exceed a predetermined threshold of darkness (i.e. it is not very dark). Similarly, the digitizing device assigns the particular pixel a value of one if the degree of darkness does exceed the predetermined threshold of darkness. This simplification eliminates the grey scale and considers each pixel either black or white. In this way, a paper document may be represented as an array of pixels where each pixel may be represented by a one or a zero. A computer may be used to manipulate, store, or transmit the pixels as desired. The predetermined threshold of darkness can often be adjusted by the user of the digitizing device to best preserve the information in view of the loss of grey scale.

The number of bits or pixels in an image depends on the size of the image and on the resolution of the digitizing device. Resolution is a measure of the precision of the digitizing device and is typically expressed in Dots Per Inch (DPI). The greater the DPI of a digitizing device, the more likely the digitized image will appear similar to the original document when a computer displays or prints the digitized image. Common resolutions used today include 100, 150, 200, 240, and 300 DPI.

To illustrate the large amount of data that is generated when digitizing a document, the following example is set forth. At 200 DPI, which is not even at the high end of common resolutions that are used today, a digitized 8.5"×11" sheet of paper requires about 3.7 megabits (i.e. 467,500 megabytes) of digitized data. The equivalent of four 1 megabit RAM's would be required to store this much data. In addition, approximately 6.5 minutes would be required to transmit this much data at rate of 9600 bits/second. It is clear that some sort of data reduction method had to be developed to efficiently handle these large data files.

In response thereto, designers have developed special encoding algorithms which have proved to substantially reduce the quantity of data while retaining all of the information contained therein. These algorithms have been termed data compression algorithms—or data compression. The amount of data after data compression divided by the amount of data before data compression is known as the compression ratio. A unique feature of "lossless" data compression algorithms is that a computer can decompress the compressed image and recover the original image. That is, no information is lost due to the compression step.

The field of data compression has many terms of art. A few of these terms will be defined and discussed. A "run" is a succession of pixels, all of which are one color. Runs alternate in color and stop at the end of a line. Run length refers to the number of successive pixels in a run. A busy image has a relatively short average run length whereas a non-busy image has a relatively long run length. Run-length coding-based compression algorithms are most effective on images that have relatively long average run lengths for reasons that will be discussed later. In fact, the average run length of an image has the greatest influence on compression efficiency and effectiveness.

Several commercial groups have attempted to negotiate standard compression algorithms to ensure compatibility between various manufacturer's products. One of these groups is the International Telegraph and Telephone Consultative Committee (CCITT). The CCITT is an international group representing many countries throughout the world. The CCITT has adopted several "standard" compression formats. Two of these standard formats, namely the Group-3 and the Group-4 standards formats, are now widely accepted throughout the world.

The CCITT standard compression formats can be classified into two general categories; 1-dimensional compression algorithms and 2-dimensional algorithms. Both the Group-3 and the Group-4 standard compression formats use either the 1-dimensional algorithms, the 2-dimensional algorithms or a combination thereof.

Group-3 1-dimensional encoding generally comprises a two step process. First, the run lengths of each run are calculated as discussed above. Second, the run lengths are substituted for codes. The codes are typically much shorter than the run length value themselves. The CCITT standards recognize that some run lengths are more likely to occur than other run lengths in a typical document. Researchers determined the probabilities of each run length occurring, which are not the same for white and black runs, and developed tables of codes to substitute for each run length value. The codes vary in size and the tables assign shorter codes to more likely run lengths. More importantly, the codes eliminate wasted bits because the codes are designed such that they may be spliced together without respecting byte boundaries. The Group-3 1-dimensional scheme may replace as many as 63 pixels with a single "terminating" code.

The Group-3 2-dimensional scheme produces a coding line with reference to a preceding reference line. That is, the transition points within the coding line are expressed relative to the transition points in an adjacent reference line. Two-dimensional compression schemes are very effective because in typical images, most coding lines differ very little from a corresponding reference line when the reference line is located adjacent thereto. Research has shown that 75% of transitions from one color to another color occur directly below or within one pixel to the left or right of a transition on the reference line. Two-dimensional schemes exploit this regularity by employing very short codes to express a run in terms of the transition points in the adjacent reference line.

The Group-4 algorithm is an optimized version of the Group-3 algorithm.

Further information regarding the CCITT's standard compression formats can be found in *Standardization of Group-3 Facsimile Apparatus For Document Transmission*, CCITT, Recommendations T.4–T.6 (Geneva, 1980, amended at Malaga-Torremilinos, 1984), and *Compression Algorithms Reduce Digitized Images to Manageable Size*, William C. Warner, EDN, pp. 203–212, Jun. 21, 1990. These documents are expressly incorporated herein by reference.

The compression techniques described above are used widely today. Common uses include compressing executable files so that a software program may fit on a floppy disk, compressing data before it is transferred over a facsimile machine, or compressing backup files or other files that are not used regularly. Another popular use for data compression is for compressing digitized image files. There is a growing need to compress image files as digitizer and scanners become more cost effective and widely accepted.

One growing application where electronic image files are used extensively is that of electronically storing copies of paper documents. Often, an electronic copy of a document does not exist. An efficient way to create one is through image scanning and digitizing. Retaining electronic copies of documents, rather than keeping the paper documents themselves, can have significant advantages. First, electronic copies of digitized documents can be much more efficiently stored. Many documents can be placed on a single storage medium. Second, the electronic copies can be sent across existing telephone lines whereas the corresponding paper document have to be mailed or otherwise delivered. Finally, electronic copies can be used as a backup for paper copies of documents. That is, in the event that the paper copy is lost or destroyed, the electronic copy can be used in place thereof or visa-versa.

It has been recognized that the banking industry may benefit from such technology. In one specific application, the banking industry may use electronic scanning and digitizing for storing negotiable checks after they have been cashed. Typically, a clearing bank receives a check, makes a photographic copy thereof for backup purposes, and then transfers the original check back to the drawing bank via postage or other transfer means. Using electronic scanning and digitizing technology, the clearing bank may electronically digitize the paper check received and then either: (1) transfer only the electronically digitized information back to the drawing bank; or (2) transfer the paper check and use the electronically digitized copy of the check for backup purposes. Potential advantages of transferring only the electronically digitized information to the drawing bank may include saving on postage costs and increasing the speed at which the check is transferred to the drawing bank. A potential advantage of using the electronically digitized copy of the check as a backup includes saving on photocopy and storage costs. The aforementioned applications of electronically digitizing technology are only exemplary and it is recognized that other advantages may be realized in the banking industry. Further, it is recognized that numerous other applications exist in other industries as well.

A particular problem that may arise when documents are to be routinely digitized is that some documents may require more memory to store the resulting image than other documents. For example, a "busy" document may require more memory to store than a corresponding "clean" document, even after data compression. As previously stated, busy documents may have a relatively short average run length while clean documents may have a relatively long average run length. Taken to the extreme, a document that results in a "checkerboard" pattern after digitization is the busiest document that can be realized because the average run length will equal one. Conversely, a document that results in an all white pattern after digitization is the cleanest document that can be realized because the average run length will equal the line length.

It has been estimated that a maximum sized standard check having a checkerboard pattern may require approximately 1.28 MB of memory after compression. A same sized check having an all white pattern may require approximately 4 KB of memory. Therefore, if enough memory is provided to store the worst case image, a substantial amount of memory may be wasted when "average" documents are digitized and stored.

It is thus recognized that when a system has the capability to routinely digitize and store various images, the system designer must either provide enough memory to store the worst case image or sacrifice a portion of the worst case image in the interests of system efficiency. That is, when only a portion of the memory that is required to store the worst case image is provided in the system, a portion of a worst case image must be truncated at some point. The truncation point will be dictated by the amount of memory provided in the system.

Several methods may be used to compensate for the limitation of memory including: (1) aggressively increasing the threshold of what is considered a "1" by the digitizing device thereby decreasing the number of ones within the image and thus making the worst case "checkerboard pattern" much less likely to occur; or (2) simply stopping the stream of compressed data once a predetermined memory limitation has been exceeded. A disadvantage of the first method above is that the image may be washed out to the point of illegibility. A disadvantage of the second method above is that a decompressor may detect an error when decompressing the image because the image data will most probably be abruptly interrupted in the middle of a row. Another disadvantage of the second method is that the number of rows which were actually compressed by the compressor will be unknown. The primary disadvantage is that the number of pixels actually stored will vary as between documents of the same size, thus not preserving the size of the document stored.

SUMMARY OF THE INVENTION

The present invention overcomes many of the disadvantages of the prior art by providing a system which has less memory than is required to store a worst case image. This approach strikes a balance between the cost effectiveness of the system and the need to store then entire image in the rare case when truncation actually occurs.

The present invention may truncate an image when the memory requirements for the compressed image exceeds a predetermined threshold. Unlike the prior art, the present invention contemplates replacing all pixels that are eliminated by the truncation process with a series of "0's" thereby "white filling" the truncated portion of the image. The present invention avoids the disadvantages in the prior art by ensuring that the truncated compressed image contains the same number of pixels as a non-truncated image. Further, the data extent of the truncated image may be the same as a non-truncated image. Finally, the resulting images, either non-truncated images or, if necessary, truncated images, may be stored in a preselected memory size. Other advantages include low cost implementation, limited additional per unit cost of the system, and ease of development within a particular application.

For example, suppose that the maximum desired image size is 64 kilobytes. As stated above, the image of a paper check of average size comprising all white data may be compressed into 4 kilobytes using a CCITT compression algorithm. Thus, in the present invention, the truncation threshold may be set at 60 kilobytes. If a particular image is sufficiently busy, and therefore truncation occurs, the remaining "white fill" pixels can be compressed to less than 4 kilobytes, yielding a compressed image size of less than 64 kilobytes. The present invention thus allows any image, busy or otherwise, to be compressed into a predetermined memory size.

The present invention does not wash out the entire image to the point of illegibility as the prior art suggests. Further, the image data will not be abruptly interrupted in the middle of a row. Finally, the number of rows which were actually compressed will be known. Hence the actual size of the document will be inherently stored with the data.

A preferred embodiment of the present invention may be used for creating image data for checks throughout the banking industry. Checks may be passed under an electronic camera which creates a digitized image thereof. The digitized image may then be passed through a multiplexer and into a compressor. In a preferred embodiment, the compressor employs the CCITT Group-3 or Group-4 compression algorithms.

A counter is provided which keeps track of the memory required to store the compressed data as the data is produced by the compressor. When the counter reaches a predetermined threshold, a signal is sent to the multiplexer causing the multiplexer to deselect the input that is coupled to the image data and to selects an input that is coupled to a "logic-0", thereby truncating the image at that point. Each pixel of the image following the point of truncation is replaced by a "0" thereby "white filling" the remainder of the image.

A check may be scanned by the electronic camera such that a predetermined portion of the truncated image is "white filled". For example, the top portion of a check may be determined to be the least critical region and thus the portion that will be white filled if a truncation occurs. Because the bottom portion of a check contains the account number, the signature line, and the amount, that portion is considered more critical and therefore should not be truncated. For other applications, the present invention may be adapted to "white fill" whatever portion of the image that is deemed to be the least critical region by simply changing the scan direction of the electronic camera. Another solution contemplated is to simply change the orientation of the checks as they are passed under the electronic camera to achieve the same result.

It should be recognized that these embodiments are only exemplary and do not in any way limit the scope of the present invention.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 1 illustrates a digitized image of a letter "K" as read by a digitizing scanner or video camera;

FIG. 2 shows the CCITT compression algorithm's terminating codes for various run lengths;

FIG. 3 shows the CCITT compression algorithm's make-up codes for various run lengths;

FIG. 5 illustrates the CCITT's G3-2D compression algorithm wherein certain transition points in the reference and coding lines are found and labeled;

FIG. 6 illustrates the applicable vertical codes that replace the run in the coding line if the A1 transition is within 3 bits of the B1 transition;

FIG. 7 illustrates the repositioning of the transition labels after the applicable vertical code has been substituted;

DETAILED DESCRIPTION OF THE PREFERRED EMBODIMENTS

Figure 4A:
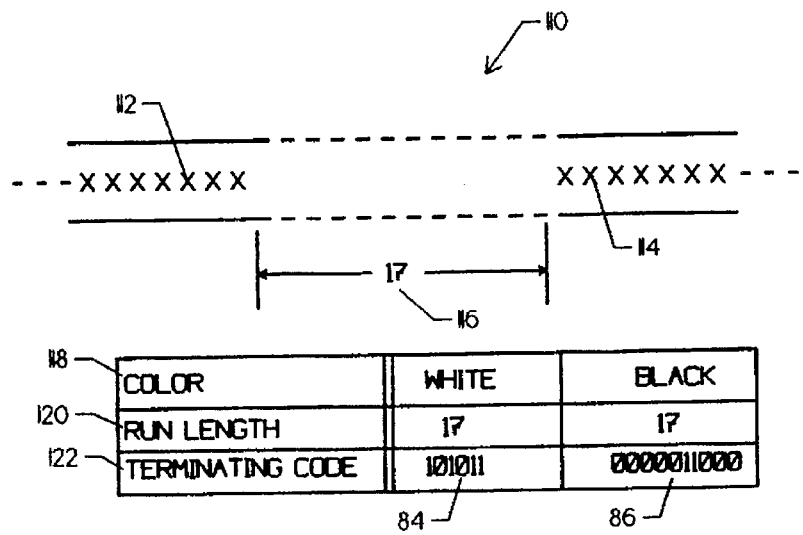
FIG. 4A illustrates the CCITT's G3-1D compression algorithm using only the terminating code from FIG. 2.

FIG. 1 represents a digitized image of a letter "K" as read by a digitizing scanner or video camera. Scanners and video cameras have the ability to digitize documents, and thus, code them as ones and zeros. Typically, zeros may represent white pixels of a document while ones may represent black pixels of a document. Digitizing devices view a document as a large number of pixels, where each pixel has a degree of darkness. The degree of darkness falls somewhere on a light to dark continuum. A particular pixel is assigned a value of zero by the digitizing device if the degree of darkness does not exceed a predetermined threshold of darkness. Similarly, a particular pixel is assigned a value of one by the digitizing device if the degree of darkness does exceed the predetermined threshold of darkness. The predetermined threshold of darkness can often be adjusted by the user of the digitizing device. In this way, a paper document may be represented as an array of pixels, where each pixel is represented as either a one or a zero.

The digitized image of the letter "K", as read by a digitizing device, is generally shown at 10. Digitizing devices typically construe the array of pixels as a plurality of lines. Each line is typically scanned from left to right to determine the darkness of each pixel contained therein. Line number column 12 shows each individual line number of the digitized image of the letter "K". The digitizing device may first scan line zero 14 from left to right, determining which pixels are ones and which pixels are zeros. As shown in FIG. 1, all of the pixels in line-0 14 are zeros. After line-0 14 has been scanned in by the digitizing device, line-1 16 is then scanned. The digitizing device continues to scan successive lines of the image until the end of the image is reached. Each of the lines in the image including line-0 14, line-1 16, and line-9 18 may comprise an end-of-line (EOL) character indicating the end of each corresponding line.

The number of bits or pixels in an image depends on the size of the image and on the resolution of the digitizing device. Resolution is a measure of the precision of the digitizing device. That is, the digitizing device divides an image into an array of pixels which are then digitized. The greater the number of pixels per square inch, the greater the resolution of the digitized image. Higher resolution digitized images are more likely to appear like the original when a computer displays or prints the digitized image. Resolution is typically expressed as the number of dots per inch (DPI). Common resolutions are 100, 150, 200, 240, and 300 DPI.

Lines 14, 16, and 18 represent separate and distinct rows within the image 10. One row of the image 10 corresponds to one line of a document. At 200 DPI, a document has 200 lines per vertical inch, and each line has 200 pixels per horizontal inch.

At 200 DPI, which is in the middle of the commonly used resolution spectrum, a digitized 8.5" by 11" sheet of paper requires about 3.7 megabits of digitized data. To store this much data requires the equivalent of four 1 megabit RAMs. To transmit 3.7 megabits of data at 9600 baud would require approximately 6.5 minutes. From this, it is clear that some sort of data reduction method must be developed. In response thereto, designers develop special encoding algorithms which have proven to substantially reduce the quantity of data while retaining all of the information contained therein. These encoding algorithms are generally called data compression algorithms. The amount of compressed data after data compression divided by the amount of data before data compression is known as a compression ratio. A useful feature of data loss less compression algorithms is that a computer can decompress the originally compressed data and recover the original image. Thus, no information is lost due to the compression step.

In the field of data compression, a "run" is a succession of pixels of all one color. Runs alternate in color and stop at the end of a line. Run lengths refer to the number of successive pixels in a particular run. A busy image has a short average run length whereas a non-busy image has a relatively long run length. Compression algorithms are most effective on images that have relatively long average run lengths.

FIG. 2 shows the CCITT's compression algorithms terminating codes for various run lengths. The International Telegraph and Telephone Consultative Committee (CCITT) is an international group that has developed internationally recognized standards for compression formats. Two of these standards, namely the Group-3 and the Group-4 standards, have proven to be popular in recent years.

Group-3 one dimensional encoding comprises a two-step process. First, the run lengths of each run in an image are calculated. Second, the run lengths may be substituted with predefined codes. The codes are typically much shorter than the run length value themselves. The CCITT standards are based in part on the idea that some run lengths are more likely to occur than other run lengths. Researchers determined the probabilities of each run length occurring in a typical document, which are not the same for white runs and black runs, and developed tables of codes to substitute for various run length values. The codes vary in size and the tables assigned shorter codes to more likely run lengths. More importantly, the codes eliminate wasted bits because the codes may be spliced together without respecting byte boundaries. The Group-3 1-dimensional scheme replaces as many as 63 pixels with a single "terminating code".

The terminating codes developed for the CCITT standards are generally shown at 74. Various run lengths are shown in column 78. The terminating codes for white runs are shown at in column 76. The terminating codes for black runs are shown in column 80. For each run length in the run length column 78, a corresponding terminating code exists for a white run having that length. Similarly, a corresponding terminating code exists for a black run having that run length. For example, a white run having a length of 17, as shown at 82, may be replaced with a terminating code shown at 84. Similarly, a black run having a length of 17, as shown at 82, may be substituted with a terminating code as shown at 86.

FIG. 3 shows the CCITT compression algorithms make-up codes for various run lengths. The Group-3 1-dimensional algorithm replaces runs of as many as 63 pixels with a single "terminating" code (see FIG. 2). However, if the run exceeds 63 pixels in length, the run may be replaced with a combination of "make-up" codes and, even if the make-up codes express the run length exactly, a final terminating code.

The make-up codes of the CCITT compression algorithm are generally shown at 90. Various run lengths are shown at 94. The corresponding white make-up codes are shown at 92. The corresponding black make-up codes are shown at 96. For example, for a run having a run length of 896, as shown at 98, the corresponding white make-up code is shown at 100, and the corresponding black make-up code is shown at 102. For runs having run lengths greater than or equal to 1,728, the make-up codes are the same for either white or black runs as shown at 106. For example, a run having a run length of 2560 is replaced with the make-up code shown at 140 regardless of whether the run is white or black.

FIG. 4A illustrates the CCITT's G3-1D (Group-3 1-Dimensional) compression algorithm using only the terminating codes from FIG. 2. The compression algorithm is generally shown at 110. A first run is shown at 112, and a second run is shown at 114. Located in between run 112 and run 114 is run 116, having a run length of 17. Both cases are shown where run 116 is white and where run 116 is black. The run length of run 116 is shown at 120. In both cases, the white run length is 17 and the black run length is 17. Finally, the terminating codes are shown at 122. For a white run, having a run length of 17, the appropriate terminating code is shown at 84, which is taken from the table shown in FIG. 2. For a black run, having a run length of 17, the appropriate terminating code is shown at 86, and is also taken from the table shown in FIG. 2. Note that the terminating code for the white run and the terminating code for the black run are different. When run 116 is compressed via the CCITT G3-1D compression algorithm, run 116 will be replaced by the terminating code at 84 if the run is white, and will be replaced by the terminating code at 86 if the run is black.

Figure 4B:
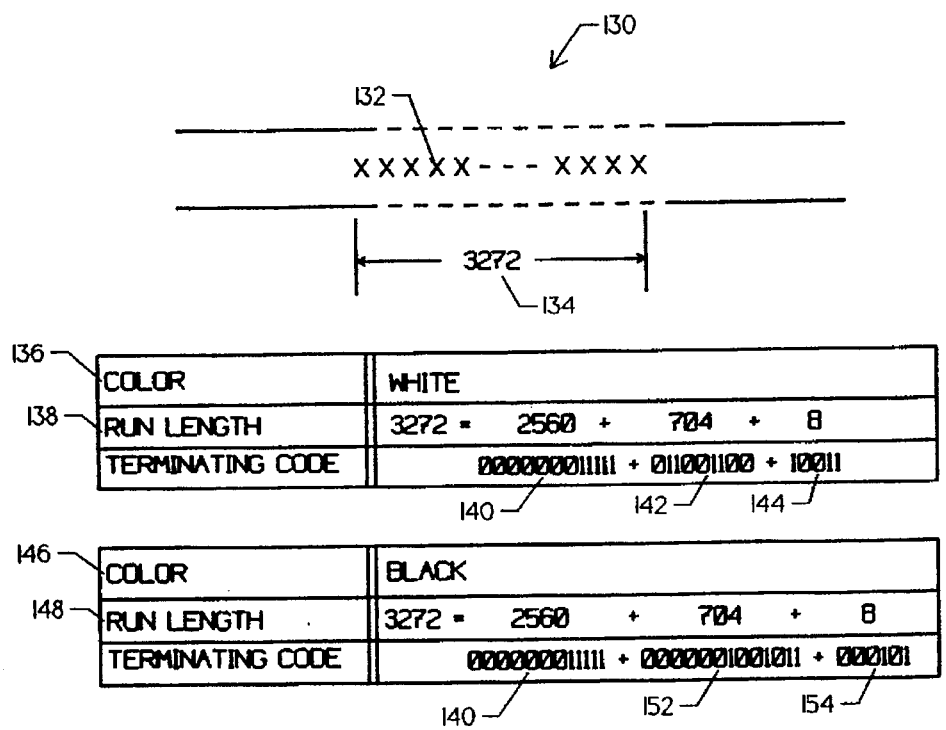
FIG. 4B illustrates the CCITT's G3-1D compression algorithm using the terminating codes from FIG. 2 and the make-up codes from FIG. 3.

FIG. 4B illustrates the CCITT's G3-1D compression algorithm using the terminating codes from FIG. 2 and the make-up codes from FIG. 3. The algorithm is generally shown at 130. A run is shown at 132 having a length of 3272. Alternative colors of run 132 are shown at 136 and 146. The run length of run 132 is shown at 138 and 148. The run length may be broken down into the sum of three values taken from FIG. 2 and FIG. 3. In this instance, run 132 has a run length of 3272. The value 3272 may be expressed as the sum of 2560+704+8. If run 132 is white, the corresponding make-up codes and terminating codes are shown at 140, 142 and 144. If run 132 is black, the corresponding make-up codes and terminating codes are shown at 140, 152 and 154. These make-up codes and terminating codes are taken from FIG. 2 and FIG. 3. Note that the make-up code for 2560 is the same for both black runs and white runs as described in the discussion referring to FIG. 5. Therefore, when using the CCITT's G3-1D compression algorithm, run 132 may be substituted by the concatenation of fields 140, 142 and 144 if the run is white. Similarly, if the run is black, run 132 may be substituted by the concatenation of fields 140, 152 and 154. Hence, 3272 pixels of digitized data may be replaced by a 26-bit code. This clearly illustrates the reduction of data provided by data compression algorithms.

FIG. 5 illustrates the CCITT's G3-2D (Group-3 2-dimensional) compression algorithm wherein certain transition points in the reference encoding lines are found and labeled. The G3-2D algorithm encodes a coding line with reference to a preceding reference line. Two-dimensional compression algorithms have proved to be very effective because in typical images, many lines differ very little from the lines located adjacent thereto. Research has shown that 75% of transitions from one color to another color occur directly below or within one pixel to the left or right of a transition on the reference line above. Two-dimensional schemes exploit this regularity by employing very short codes to express a run of data in terms of the transition points in an adjacent reference line. In places where the coding and reference lines are not sufficiently similar, two-dimensional schemes typically use one dimensional run length substitution codes to encode that portion of the coding line. Each coding line becomes the reference line for its successor.

The important features in a line of pixels are the points at which the pixels change color. These are know as transition points or changing points. That is, every pixel that is not the same color as its immediate predecessor is a transition point. Compression algorithms, like the CCITT G3-2D compression algorithm, look for and then classify the transition points before deciding how to encode a particular line. For CCITT G3-2D compression, five separate transition points are used for encoding each segment of a line. These are illustrated in FIG. 5 generally at 160. A0 166 points to the starting pixel on a coding line 164. A0 then moves to the right as each segment of the coding line 164 is encoded. This will be discussed in more detail later. A1 168 points to the next changing pixel on coding line 164 to the right of A0 166. A2 170 points to the next transition point on coding line 164 to the right of A1 168. B1 172 points to the first transition point on the reference line to the right of A0 166, but of opposite color. B2 174 points to the next transition point on the reference line to the right of B1 172.

A portion of coding line 164 qualifies for vertical encoding when transition point A1 168 is directly below, or within three pixels to the right or left of transition point B1 172. When this is the case, the run from A0 166 to A1 168 is replaced with one of the seven vertical codes shown generally at 180 in FIG. 6. For example, if transition point B1 172 is one position to the right of transition point A1 168, as indicated at 182 (see FIG. 6), then the run from A0 166 to A1 168 is replaced with the vertical code 010 as indicated by reference numeral 184.

FIG. 7 illustrates the repositioning of the transition labels after the applicable vertical code has been substituted for the corresponding run in coding line 164. A0 196 is repositioned to the next transition point to the right of its original position in coding line 164. Similarly, A1 198 is repositioned to the next transition point to the right of its original position in coding line 164. Finally, A2 200 is repositioned to the next transition point to the right of its original position in coding line 164. B1 202 is also repositioned to the next transition point to the right of its original position in reference line 162. B2 204 is repositioned to the next transition point to the right of its original position in reference line 162. The algorithm then continues in a manner as described above. For example, since B1 202 is three positions to the left of A1 198, the run from A0 196 to A1 198 may be replaced with vertical code 0000011 as shown in the "-3" entry of table 180 (see FIG. 6).

Figure 8A:
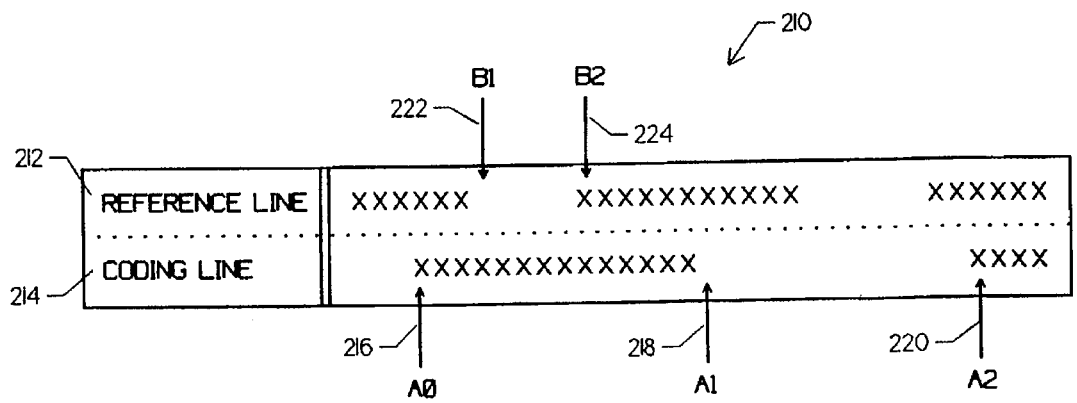
FIG. 8A illustrates the substitution of a pass code of the CCITT's G3-2D compression algorithm when the A1 transition is to the right of the B2 transition.

FIG. 8A illustrates substitution of a pass code for the CCITT's G3-2D compression algorithm when the A1 transition is to the right of the B2 transition. In this situation, the run from A0 216 to A1 218 of coding line 214 is replaced with a pass code instead of one of the vertical codes from FIG. 6.

Figure 8B:
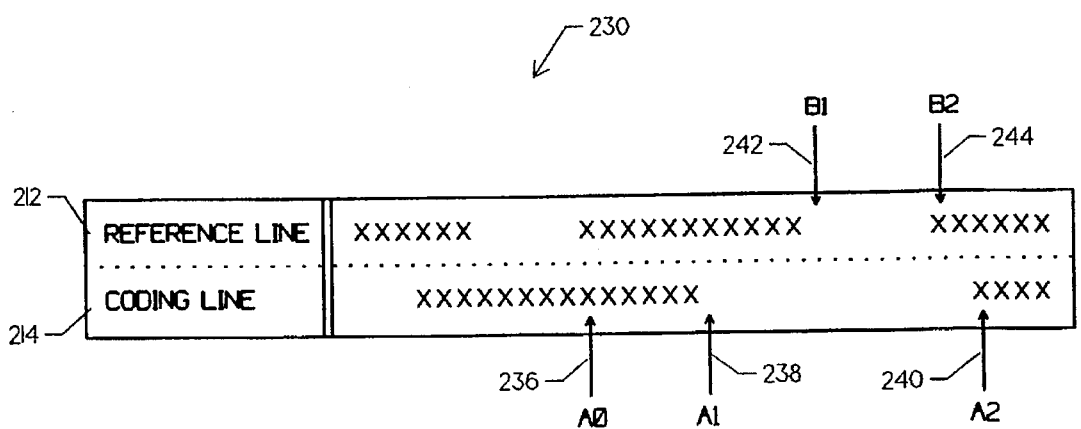
FIG. 8B illustrates the repositioning of the transition labels after a pass code has been inserted.

FIG. 8B illustrates the repositioning of the transition labels after a pass code has been inserted. In this situation, A0 236 is repositioned to the pixel below B2 224. The other transition labels are placed accordingly. That is, A1 238 is positioned to the next transition point to the right of A0 236 in coding line 214. A2 240 is positioned to the next transition point in coding line 214 to the right of A1 238. B1 242 is positioned to the next transition point to the right of the original position of B2 224 in reference line 212. Finally, B2 244 is positioned to the next transition point to the right of B1 242 in reference line 212.

Figure 9A:
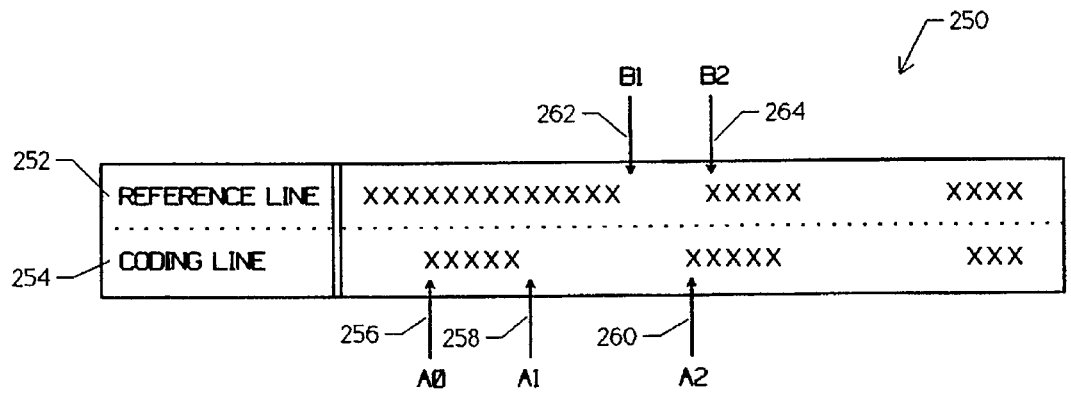
FIG. 9A illustrates the application of the G3-1D algorithm to the runs from the A0 transition to the A1 transition and from the run from the A1 transition to the A2 transition when the A1 transition is to the left of the B1 transition but not within 3 bits thereof.

FIG. 9A illustrates the application of the G3-1D algorithm to the runs from the A0 transition to the A1 transition and the run from the A1 transition to the A2 transition when the A1 transition is the left of the B1 transition, but not within three bits thereof. If a section of line does not meet the criteria for vertical or pass encoding as described above, a horizontal code followed by a G3-1D code may be used to express the run from A0 to A1 followed by a G3-1D code to express the run from A1 to A2.

Referring to FIG. 9A, B1 262 is not within three bits of A1 258. Further, A2 260 is not to the right of B2 264.

Therefore, the criteria for vertical or pass coding are not met. In this situation, the G3-2D algorithm may substitute the run from A0 256 to A1 258 with G3-1D codes as described above. Similarly, the run from A1 258 to A2 260 may be substituted with G3-1D codes as described above.

Figure 9B:
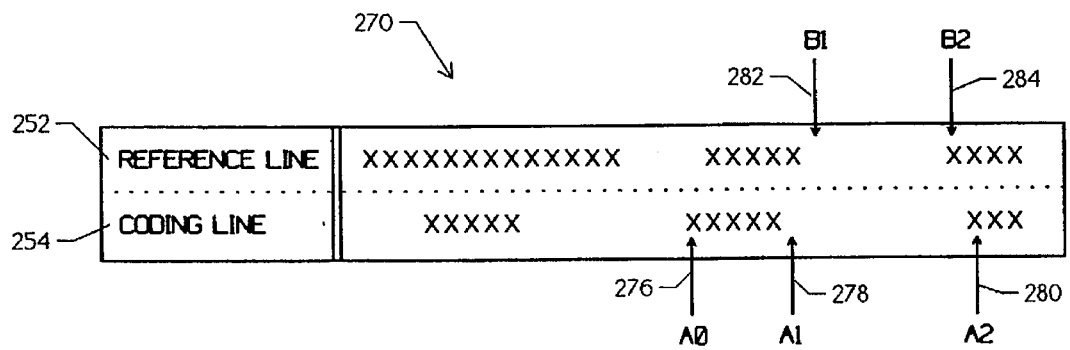
FIG. 9B illustrates the repositioning of the transition labels after a the G2-1D algorithm has been employed.

Referring to FIG. 9B, after the G3-1D codes have been substituted for the corresponding runs, transition point A0 276 may be moved to the previous position of transition point A2 260. The remaining transition points are moved accordingly. That is, A1 278 is moved to the next transition point to the right of A0 276 of coding line 254. A2 280 is moved to the next transition point to the right of A1 278 of coding line 254. B1 282 is repositioned to the next transition point to the right of the original position of B2 264 on reference line 252. Finally, B2 284 is moved to the next transition point to the right of B1 282 on reference line 252.

Occasionally, more than one type of the above-described encoding schemes may apply. When this happens, pass codes take precedence over vertical codes and vertical codes take precedence over horizontal codes. All of the codes are concatenated with one another without respecting byte boundaries.

CCITT Group-4 compression algorithm yields the best compression ratios. Group-4 is a two-dimensional encoding algorithm much like the Group-3 compression algorithm with all of the details fixed to yield the greatest compression. First, it does not require one-dimensionally coded reference lines. Second, no end of line (EOL) characters are used to mark the start of the image or the end of the lines. Finally, Group-4 has no padding and no filling, and does not respect byte boundaries, except that the compressed image starts and ends on byte boundaries. In most other respects, the Group-4 algorithm is substantially the same as the Group-3 algorithm discussed above.

FIG. 1 through FIG. 9B illustrate various methods for scanning, digitizing and compressing image data. A preferred mode of the present invention employs the CCITT's Group-3 and Group-4 compression algorithms. Further discussion of these algorithms and other compression techniques can be found in *Compression Algorithms Reduced Digitized Images to Manageable Size*, William C. Warner, EDN., Jun. 21, 1990, p. 203–212, and *Standardization of Group-3 Facsimile Apparatus for Document Transmission*, International Telegraph and Telephone Consultative Committee (CCITT), Geneva, 1980, Amended at Malaga-Torremolinos, 1984. As previously stated, these documents are incorporated herein by reference.

Figure 10A:
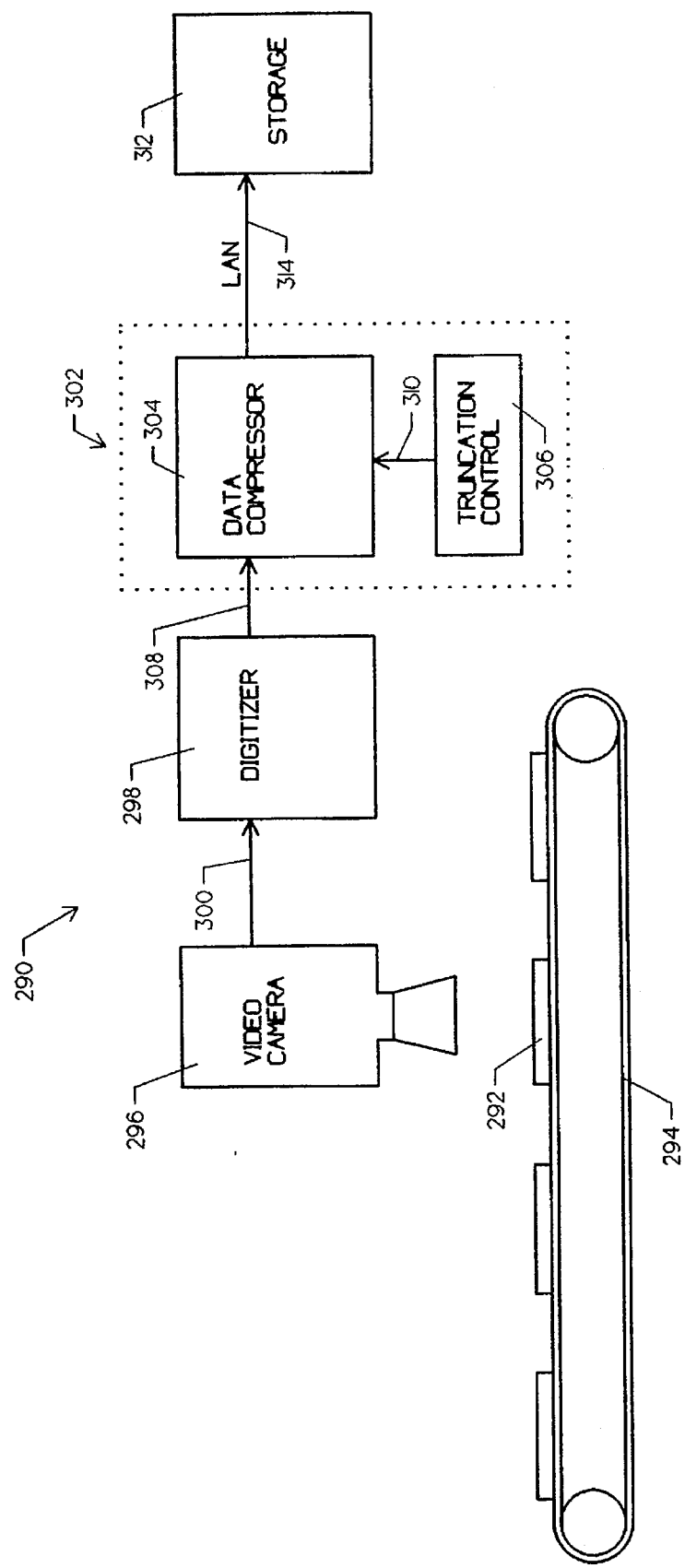
FIG. 10A is a block diagram of a preferred embodiment of the present invention.

FIG. 10A is a block diagram of a preferred embodiment of the present invention. The embodiment shown in FIG. 10A may be operated in real time. A check 292 may be fed into a track 294 which passes by an electronic camera 296. The image of check 292 may be picked up by video camera 296. It is contemplated that video camera 296 may comprise a video camera or any other scanning device. It is further contemplated that check 292 may be an engineering drawings, art work, or any other document. Finally, it is recognized that track 294 is not necessary for the present invention.

The video image created by video camera 296 may be transferred to digitizer 298 via interface 300. Digitizer 298 may digitize the image produced by video camera 296, and thus, code the image as a series of ones and zeros. Each "pixel" of an image has a degree of darkness. The degree of darkness falls somewhere on a light to dark continuum. Digitizer 298 assigns a value of zero to a particular pixel within the image if the degree of darkness of that pixel does not exceed a predetermined threshold of darkness. Similarly, a particular pixel is assigned a value of one by digitizer 298 if the degree of darkness of that particular pixel does exceed the predetermined threshold of darkness. It is contemplated that digitizer 298 may have a means for adjusting the predetermined threshold of darkness. In this way, a paper document may be represented as an array of pixels, where each pixel is represented as a one or a zero. A digitized image produced by digitizer 298 is transferred to smart compressor 302. Smart compressor 302 comprises a data compressor 304 and a truncation control 306. Truncation control 306 is coupled to data compressor 304 via interface 310. The operation of smart compressor 302 is discussed in more detail in FIG. 12. Briefly, data compressor 304 compresses the digitized image in accordance with a compression algorithm. A preferred embodiment of the present invention employs the CCITT's Group-3 or Group-4 compression algorithms. Truncation control 306 truncates the compressed image data if the memory requirements for the compressed image data exceed a predetermined limit. However, all of the pixels that are eliminated by the truncation process are replaced with "0's" thereby "white filling" the truncated portion of the image. It is also contemplated that the pixels eliminated by the truncation process could be replaced with "1's" or any other predetermined pattern. This avoids the disadvantages of the prior art by ensuring that the truncated image contains the same number of pixels as a non-truncated image.

The compressed data is transferred from smart compressor 302 to storage 312 via interface 314. It is contemplated that interface 314 may be a local area network (LAN) or any other connection means. It is further contemplated that storage 312 may comprise a RAM, register file, magnetic tape media, laser disk media, or any other electronic storage means.

The embodiment of the present invention generally shown at 290, may operate in real time. That is, compressed images of checks 292 may be stored in storage 312 without undue delay.

Figure 10B:
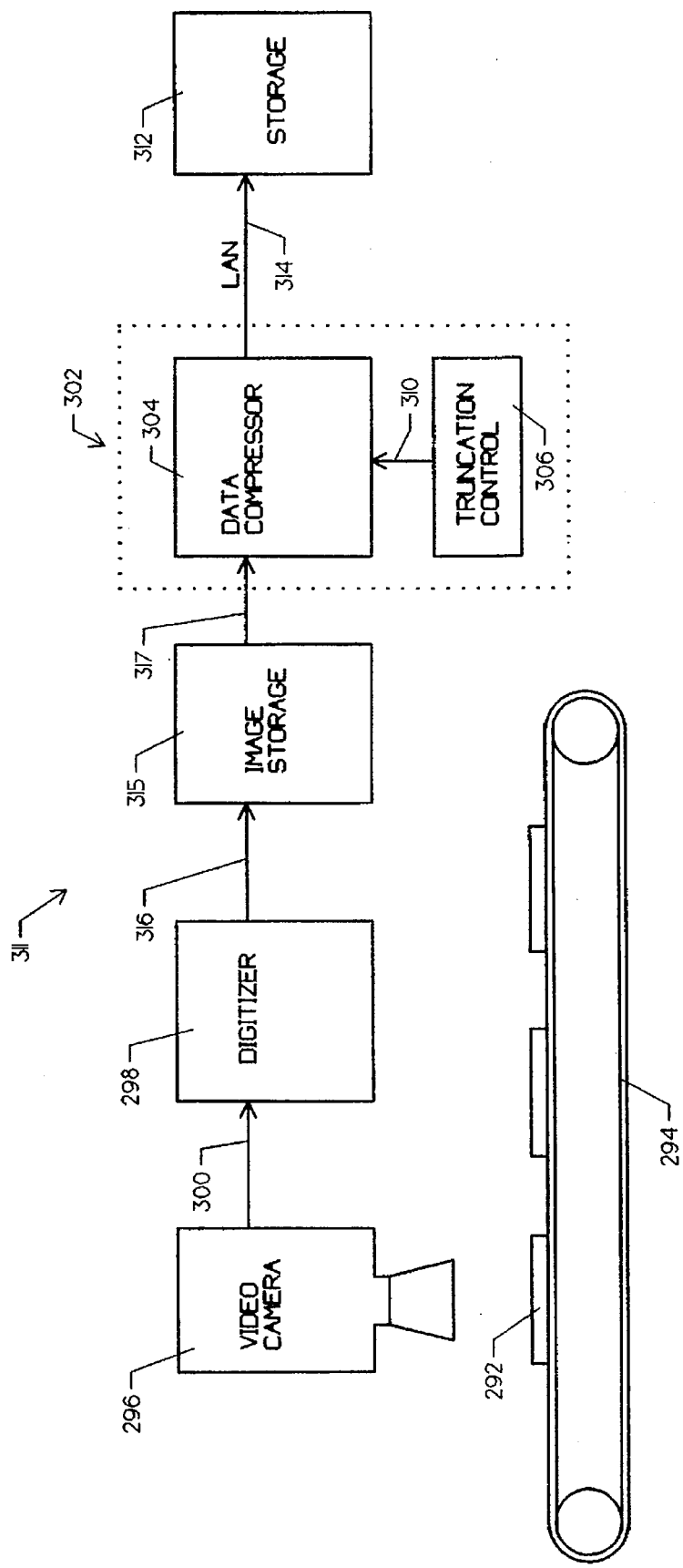
FIG. 10B is a block diagram of another of the preferred embodiments of the present invention.

FIG. 10B is a block diagram of another of the preferred embodiments of the present invention. This embodiment is shown generally at 311 and may be operated in a batch mode. This embodiment is similar to the embodiment shown in FIG. 10A except that an image storage element 315 is placed between digitizer 298 and smart data compressor 302. Image storage element 315 may be used to store non-compressed images as they are scanned and digitized by video camera 296 and digitizer 298. At a later time, and perhaps in the batch mode, smart compressor 302 may read the image data directly from image storage 315 across interface 317 and store a compressed image in storage 312 via interface 314. Smart compressor 302 operates in a similar manner as described in the description to FIG. 10A. It is contemplated that image storage element 315 may comprise a RAM, register file, magnetic tape medium, laser disk medium, or any other electronic storage means.

Figure 11:
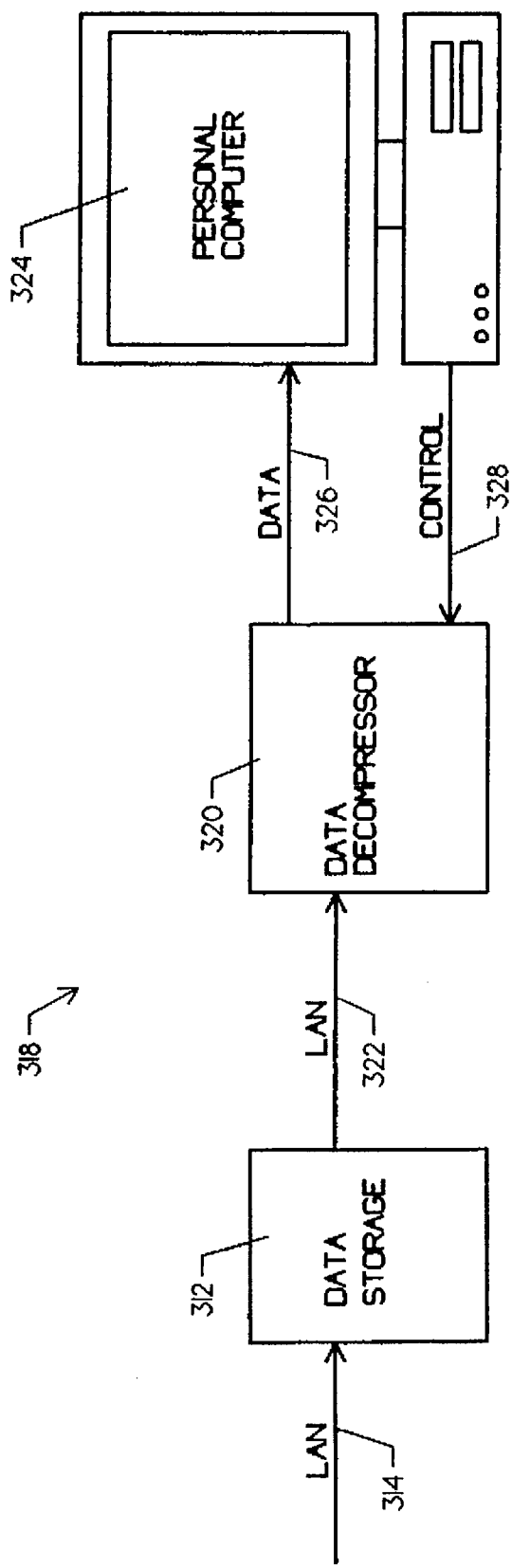
FIG. 11 is a block diagram of a preferred embodiment of the present invention for decompressing data images.

FIG. 11 is a block diagram of a preferred embodiment of the present invention for decompressing data images. Interface 314 and data storage 312 are also shown in FIG. 10A and FIG. 10B. Therefore, data storage 312 contains compressed image data as provided by smart compressor 302. Data decompressor 320 is coupled to data storage 312 via interface 322. It is contemplated that interface 322 may be a LAN or any other coupling means. Data decompressor 320 decompresses the compressed image and provides the data to personal computer 324 via interface 326. Personal computer 324 provides control signals to data decompressor 320 via interface 328. It is contemplated that personal computer 324 may comprise any means for displaying or printing the data provided by data decompressor 320. It is further contemplated that personal computer 324 may comprise a memory means for storing the decompressed image for later display.

In a preferred mode of the present invention, data decompressor 320 is a commercially available data decompressor. Such devices are readily available as basic components in facsimile, personal computing, and other communications systems. One of the advantages of the present invention, is that while smart compressor 302 truncates the digitized image if the size of the compressed data exceeds a predetermined limit, all of the pixels that are eliminated by the truncation process are replaced with "0's" thereby "white filling" the truncated portion of the image. This avoids the disadvantage in the prior art by ensuring that the truncated image contains the same number of pixels as a non-truncated image. That is, the compressed image is not abruptly interrupted in the middle of a row and the number of rows which were actually compressed are known. Therefore, a third-party decompressor may not experience any difficulty.

Figure 12:
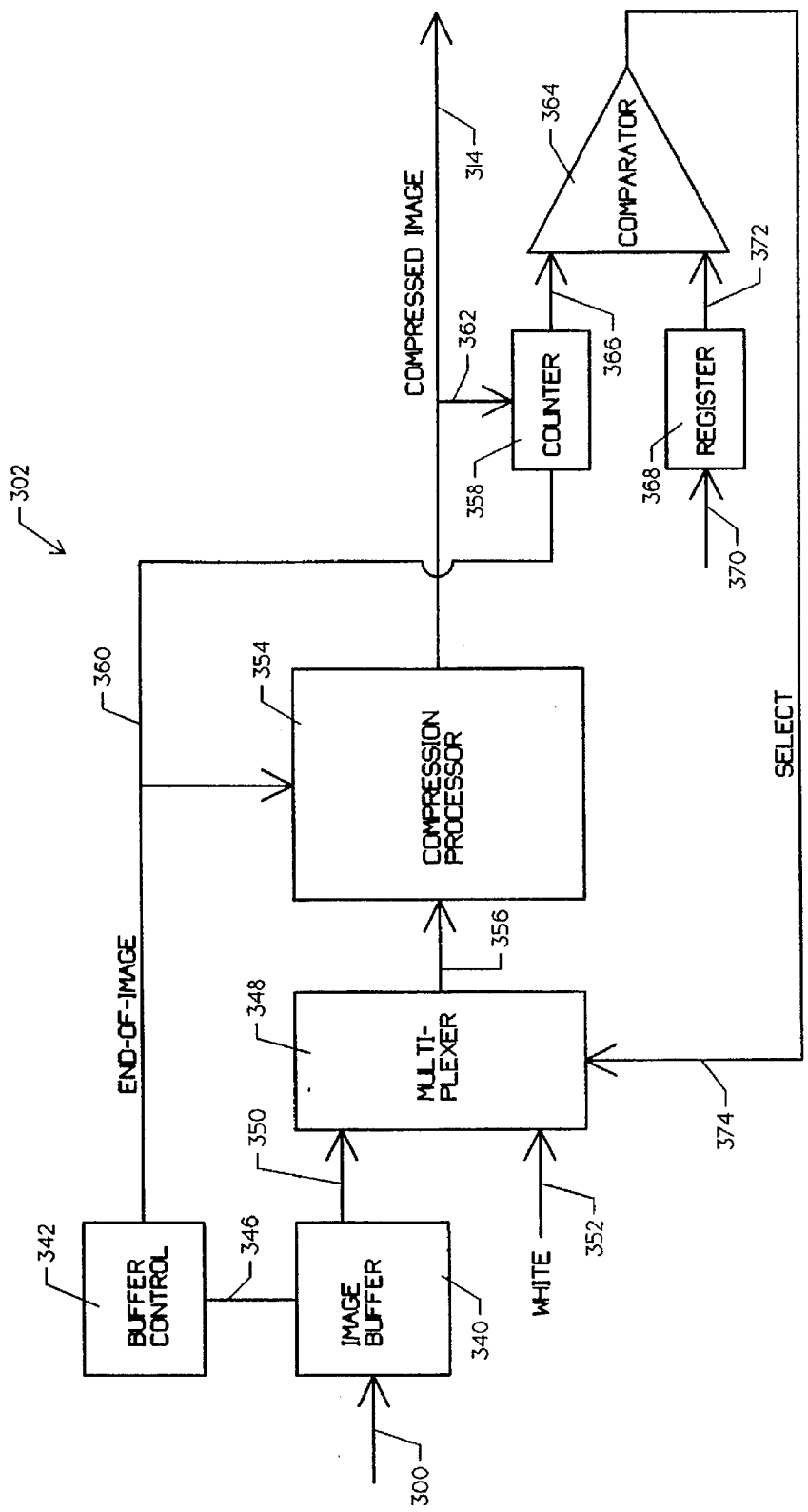
FIG. 12 is a block diagram of a preferred embodiment of the present invention for truncating the image data and for substituting white pixels for all image pixels thereafter.

FIG. 12 is a block diagram of a preferred embodiment of the present invention for truncating the image data, and for substituting white pixels for all image pixels thereafter. The smart compressor is generally shown at 302. An uncompressed image enters an image buffer 340 via interface 300. Image buffer 340 is coupled to buffer control 342 via interface 346. Buffer control 342 has a means for storing the number of bytes in the uncompressed image. Further, buffer control 342 counts the number of bytes as they are output from image buffer 340. The output of image buffer 340 is coupled to a first input of a multiplexer 348 via interface 350. The output of multiplexer 348 is coupled to compression processor 354 via interface 356. A second input of multiplexer 348 is coupled to a logic zero, or white, input via interface 352. However, it is recognized that the second input of multiplexer 348 may be coupled to a logic-1 or any other predetermined pattern of data.

Compression processor 354 compresses the image using the CCITT Group-3 or Group-4 algorithms in the preferred mode. The output of compression processor 354 is transmitted to storage 312 (see FIG. 10A) via interface 314. A counter 358 is coupled to compression processor 354 via interface 362. Counter 368 is further coupled to buffer control 342 and to compression processor 354 via interface 360. Counter 358 counts the number of output bytes that are provided by compression processor 354 onto interface 314. A register 368 may be set by a processor (not shown) via interface 370. Register 368 is typically loaded via interface 370 with a threshold limit of bytes at which truncation of the image occurs.

A comparator 364 is coupled to counter 358 via interface 366, and further coupled to register 368 via interface 372. When the value contained in counter 358 is equal to or greater than the threshold value contained in register 368, comparator 364 asserts select line 374. Select line 374 is coupled to the select input of multiplexer 348.

Initially, counter 358 is reset to zero via interface 360. This causes comparator 364 to assert a zero on select line 374. This causes multiplexer 348 to select the output of image buffer 340 on interface 350. Compression processor 354 then begins to compress the image. As each byte of the image is output from compression processor 354 onto interface 314, counter 358 increments. If the end of the image is reached before counter 358 reaches the value contained in register 368, no truncation occurs for that image. On the other hand, if counter 358 reaches or exceeds the value in register 368, comparator 364 asserts select line 374 to select the white input 352 of multiplexer 348. Image buffer 340 continues to output pixels until the end of the image is reached, but compression processor 354 only receives all white data thereafter. In either case, after compression is finished, an end-of-image signal 360 reinitializes the compression processor 354 and resets counter 358 to zero. It is recognized that image buffer 340 may comprise a RAM, register file, magnetic tape medium, laser disk medium, or any other electronic storage means. The main purpose of image buffer 340 is to synchronize the digitized image with the compression processor 354. The remaining elements in FIG. 12 are deemed to be self-explanatory.

Figure 13:
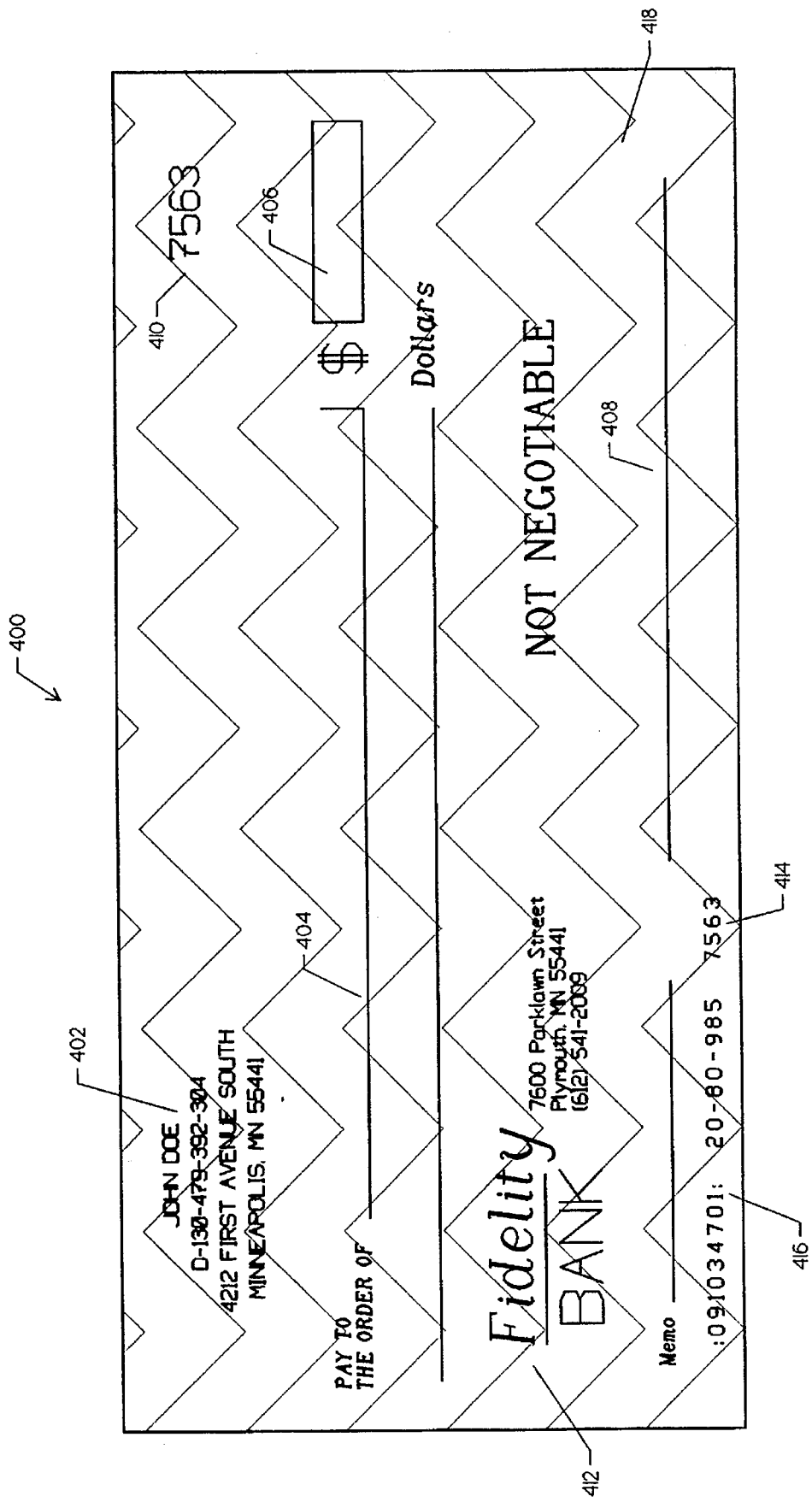
FIG. 13 is a diagram showing a blank check which may be digitized and compressed in accordance with the preferred mode of the present invention.

FIG. 13 is a diagram showing a blank check which may be digitized and compressed with the preferred mode of the present invention. A blank check is generally shown at 400. Blank check 400 may comprise an owner identification 402, a check number 410, a space for the payees name 404, an amount box 406, a bank name and address 412, a signature line 408, an account number 416, and a check number 414. Blank check 400 may also contain a background pattern 418. Blank check 400 illustrates a resulting image after passing through the present invention. That is, a paper copy of blank check 400 was scanned by video camera 296, digitized by digitizer 298, compressed in accordance with smart compressor 302, stored in storage 312, decompressed with data decompressor 320, and displayed via personal computer 324 (see FIG. 10A and FIG. 11). Because blank check 400 is not sufficiently busy to cause truncation, the entire image was stored in data storage 312 and is now displayed on personal computer 324.

Figure 14:
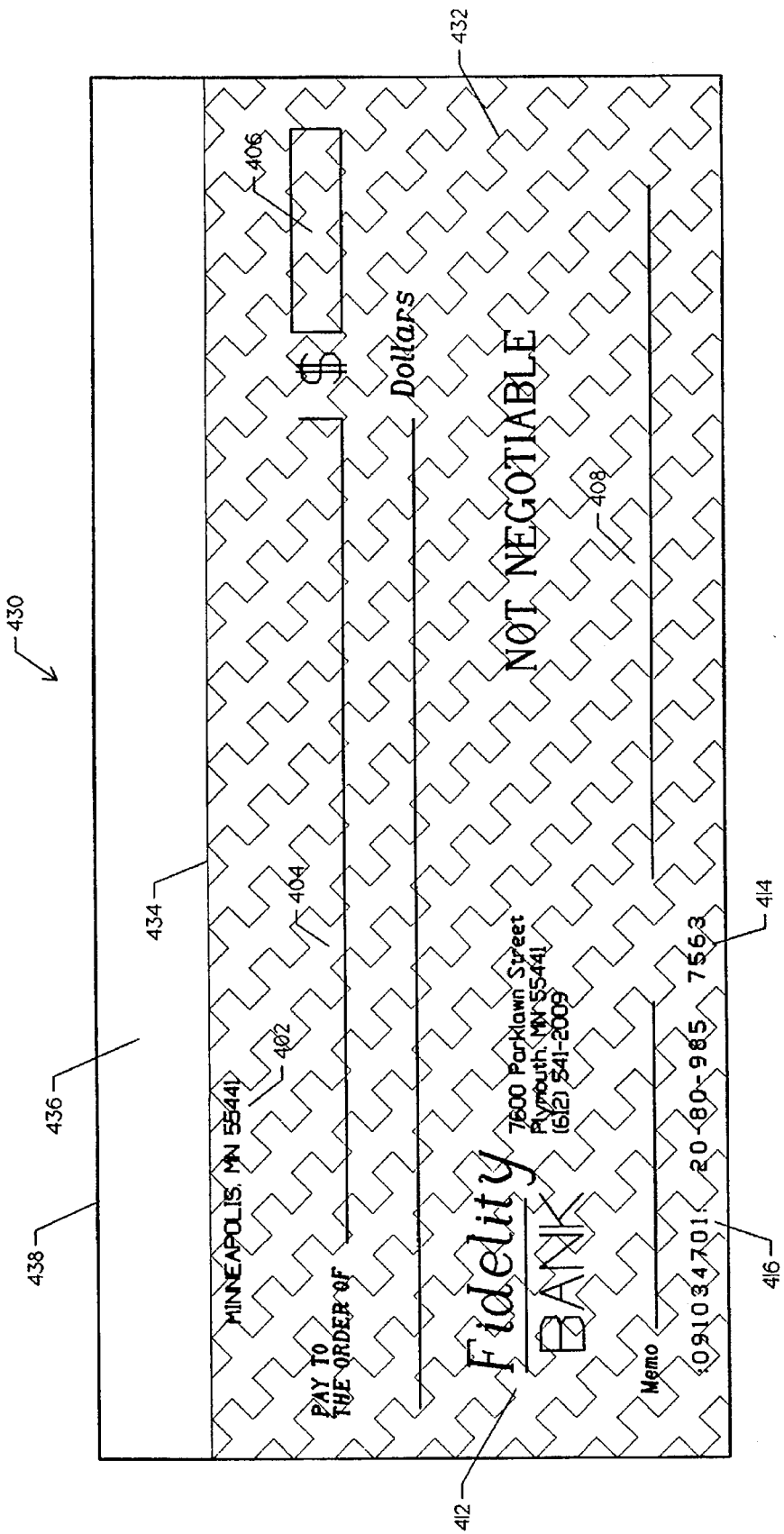
FIG. 14 is a diagram showing a blank check which has been truncated and white filled in accordance with the preferred mode of the present invention.

FIG. 14 is a diagram showing a blank check which has been truncated and white filled in accordance with the preferred mode of the present invention. A blank check is generally shown at 430. Blank check 430 has a background pattern 432 which is much busier than background pattern 418 of blank check 400 (see FIG. 14). Blank check 430 was scanned in by video camera 296, digitized by digitizer 298, compressed in accordance with smart compressor 302, stored in data storage 312, decompressed with data decompressor 320, and finally displayed on personal computer 324. It is evident from FIG. 14, that the image was truncated by smart compressor 302 because the memory requirements for the compressed data exceeded a predetermined limit. Truncation occurred at 434. All of the pixels that were eliminated by the truncation process were replaced with "0's" thereby "white filling" the truncated portion of the image. The "white filled" portion of the image is indicated at 436. This avoids the disadvantages in the prior art by ensuring that the truncated image contains the same number of pixels as a non-truncated image. That is, the data extent 438 of the image 430 is the same as for a non-truncated image. The present invention thus truncates an image allowing it to be compressed into a predetermined memory size. For example, suppose that the maximum desired image size is 64 K-bytes. As stated above, the image of a standard check of average size comprising all white data may be compressed into 4 K-bytes. Thus, in the present invention, the truncation threshold may be set at 60 K-bytes. That is, a value of approximately 60,000 (i.e. 61,440) may be loaded into register 368 via interface 370 (see FIG. 12). If a particular image is sufficiently busy, as is blank check 430, truncation will occur. However, the remaining "white fill" pixels may be compressed to less than 4 K-bytes, yielding an image size of less than 64 K-bytes as originally desired. Therefore, the present invention allows any image to be compressed into a predetermined memory size while still maintaining the original data extend 438.

Blank check 430 may be scanned by video camera 296 in a way that allows a predetermined portion of a busy check to be "white filled". For example, the top portion of blank check 430 may be determined to be the portion that will be white filled in the event truncation occurs. This may be desired because a top portion of the image of blank check 430 may be determined to be non-critical. In contrast, the bottom portion of blank check 430 may contain the account number 416, the signature 408, the issuing bank 412, and the amount 406. These may be considered critical for proper handling of blank check 430. It is recognized, however, that the present invention may be adapted to "white fill" whatever portion of the image that is deemed to be the least critical. This change can be made by simply changing the scan direction of video camera 296 or even the orientation of check 292 as it is passed under video camera 296. In addition, digitizer 298 may be programmed to interchange the rows and columns or otherwise modify the image data coming from video camera 296.

Figure 15:
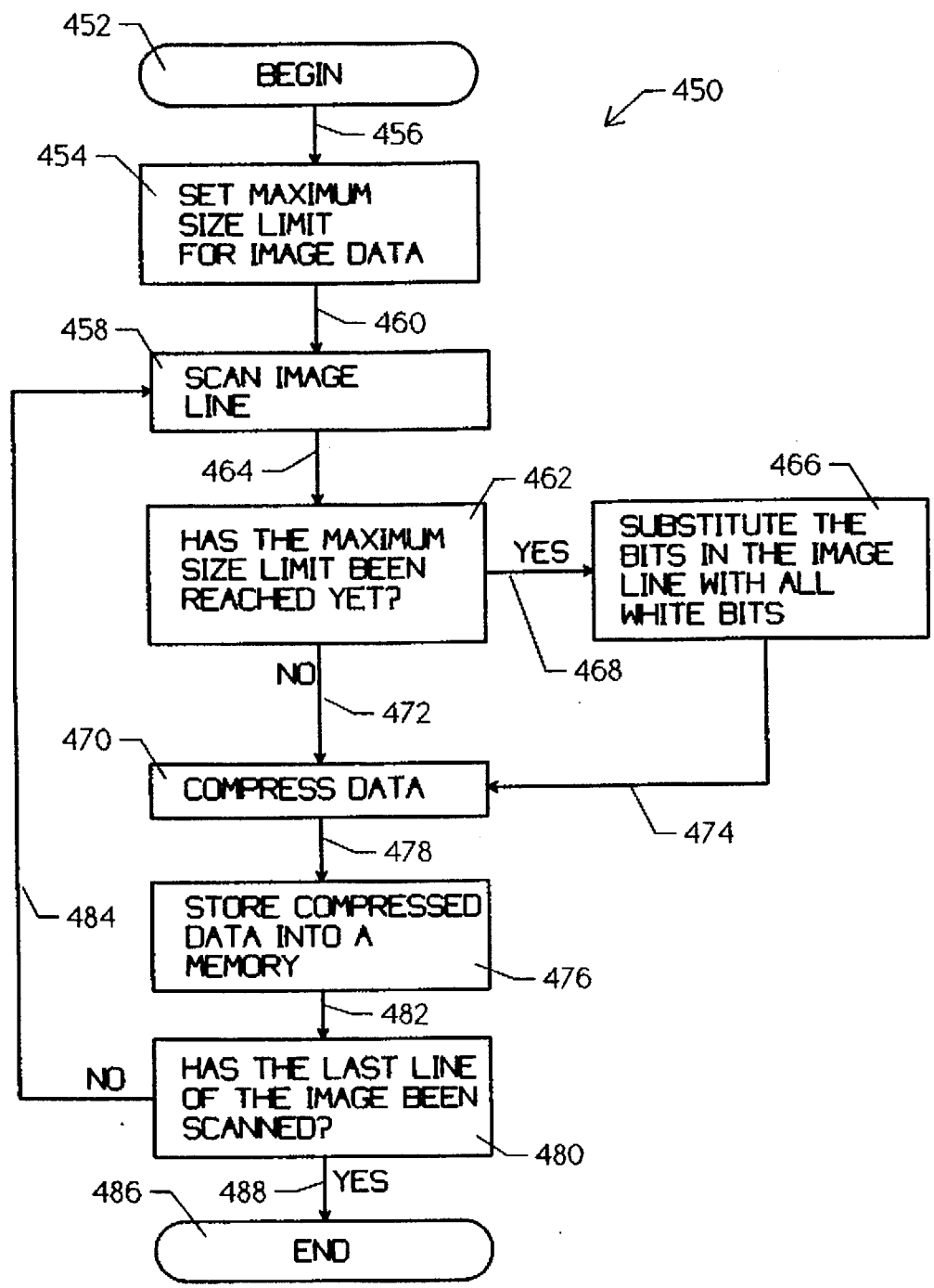
FIG. 15 is a flow diagram illustrating the operation of a preferred embodiment of the present invention.

FIG. 15 is a flow diagram illustrating the operation of a preferred mode of the present invention. The embodiment shown in FIG. 15 may be operated in real time. The algorithm is entered at element 452. Element 452 is coupled to block 454 via interface 456. Element 454 sets a maximum size limit for compressed image data. Element 454 is coupled to element 458 via interface 460. Element 458 scans a first image line of a paper document. Element 458 is coupled to element 462 via interface 464. Element 462 determines whether the maximum size limit established in element 454 has been reached. If the maximum size limit established by element 454 has not been reached, control is passed to element 470 via interface 472. Element 470 compresses the scanned image line obtained in element 458. In a preferred mode of the present invention, element 470 compresses the data in accordance with CCITT's Group-3 or Group-4 algorithms. Element 470 is coupled to element 476 via interface 478. Element 476 stores the compressed data into a memory. Element 476 is coupled to element 480 via interface 482. Element 480 determines whether the last line of the image has been scanned by element 458. If element 480 determines that the last line of the image has been scanned, the algorithm is exited and control is passed to element 486 via interface 488. If the last line has not been scanned, control is element 458 via interface 484. Element 458 scans the next successive image line of the paper document.

Referring back to element 462, if element 462 determines that the maximum size limit established in element 454 has been reached, control is passed to element 466 via interface 468. Element 466 substitutes the remaining bits in the image line with all "white" bits. Control is then passed to element 470 via interface 474. Element 470 then compresses the data provided by element 466. Since all of the data provided by element 466 is white data, element 470 can substantially reduce the amount of memory that is required to store the remainder of the image.

Figure 16:
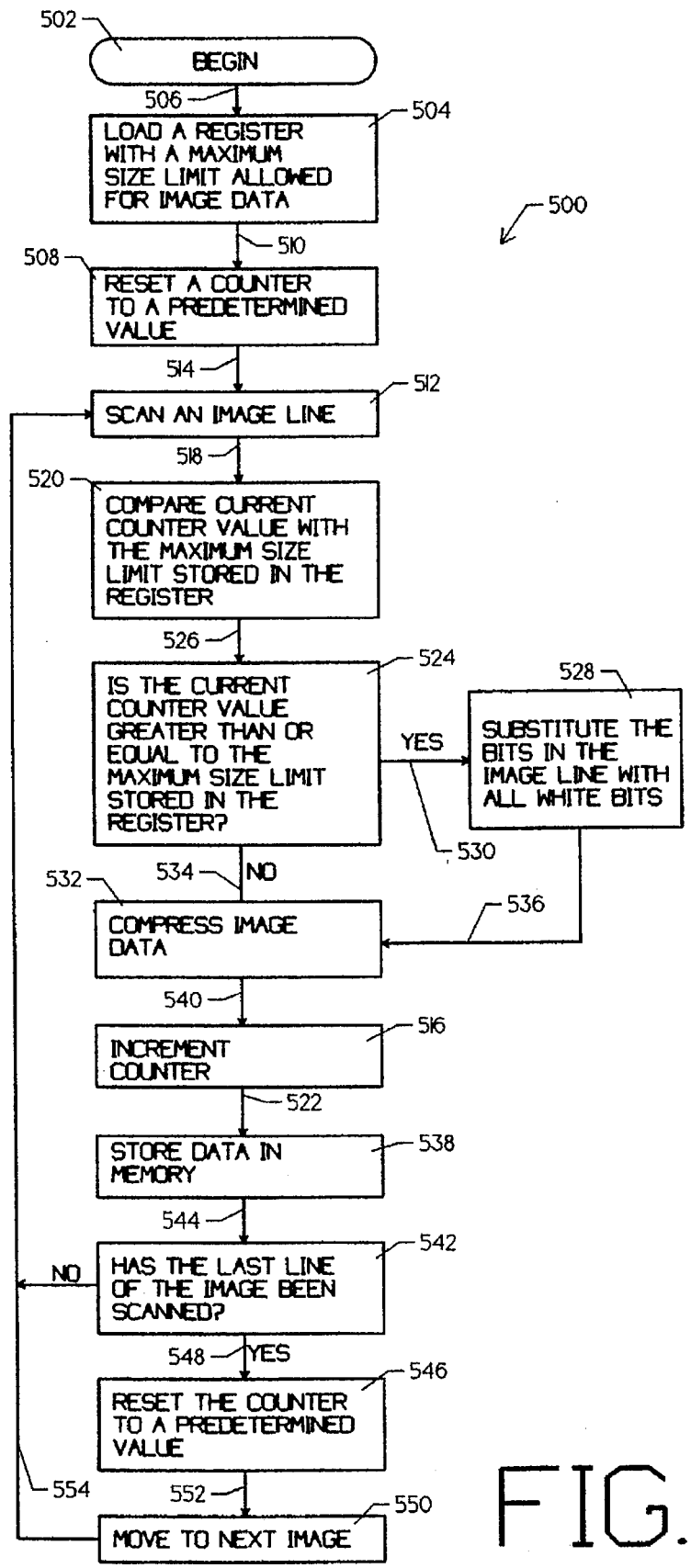
FIG. 16 is a detailed flow diagram illustrating the operation of the preferred embodiment of the present invention shown in FIG. 15.

FIG. 16 is a detailed flow diagram illustrating the operation of the preferred embodiment of the present invention as shown in FIG. 15. The algorithm is entered at element 502 and control is passed to element 504 via interface 506. Element 504 loads a register with a maximum size limit allowed for compressed image data. Element 504 is coupled to element 508 via interface 510. Element 508 resets a counter to a predetermined value. In the preferred embodiment, the counter is reset to zero. Element 508 is coupled to element 512 via interface 514. Element 512 scans in a first image line of a paper document. Control is then passed to element 520 via interface 518. Element 520 compares the current counter value with the maximum size limit stored in the register. Control is then passed to element 524 via interface 526. Element 524 determines whether the current counter value is greater than or equal to the maximum size limit stored in the register. If the current counter value is not greater than or equal to the maximum size limit stored in the register, control is passed to element 532 via interface 534. Element 532 compresses the scanned image line produced by element 512. In a preferred embodiment of the present invention, element 532 compresses the image data in accordance with CCITT's Group-3 or Group-4 algorithms. Control is then passed to element 516 via interface 540. Element 516 increments the counter once for each byte of compressed data that is output by element 532. Control is then passed to element 538 via interface 522. Element 538 stores data into a memory element. Control is then passed to element 542 via interface 544. Element 542 determines whether the last line of the image has been scanned by element 512. If element 542 determines that the last line of the image has not been scanned, control is passed to element 512 via interface 554.

Referring back to element 524, if the current counter value is determined to be greater than or equal to the maximum size limit stored in the register, control is passed to element 528 via interface 530. Element 528 substitutes the bits in the image line with all white bits. Control is then passed to element 532 via interface 536. Since all of the bits supplied by element 528 are all white bits, element 532 may substantially reduce the amount of memory required to store said bits.

Referring to element 542, if the last line of the image has been scanned by element 512, control is passed to element 546 via interface 548. Element 546 resets the counter to a predetermined value. In a preferred embodiment, the counter is reset to zero. Control is then passed to element 550 via interface 552. Element 550 places another paper document in front of a scanner or digitizing device and control is passed back to block 512 via interface 554.

Figure 17:
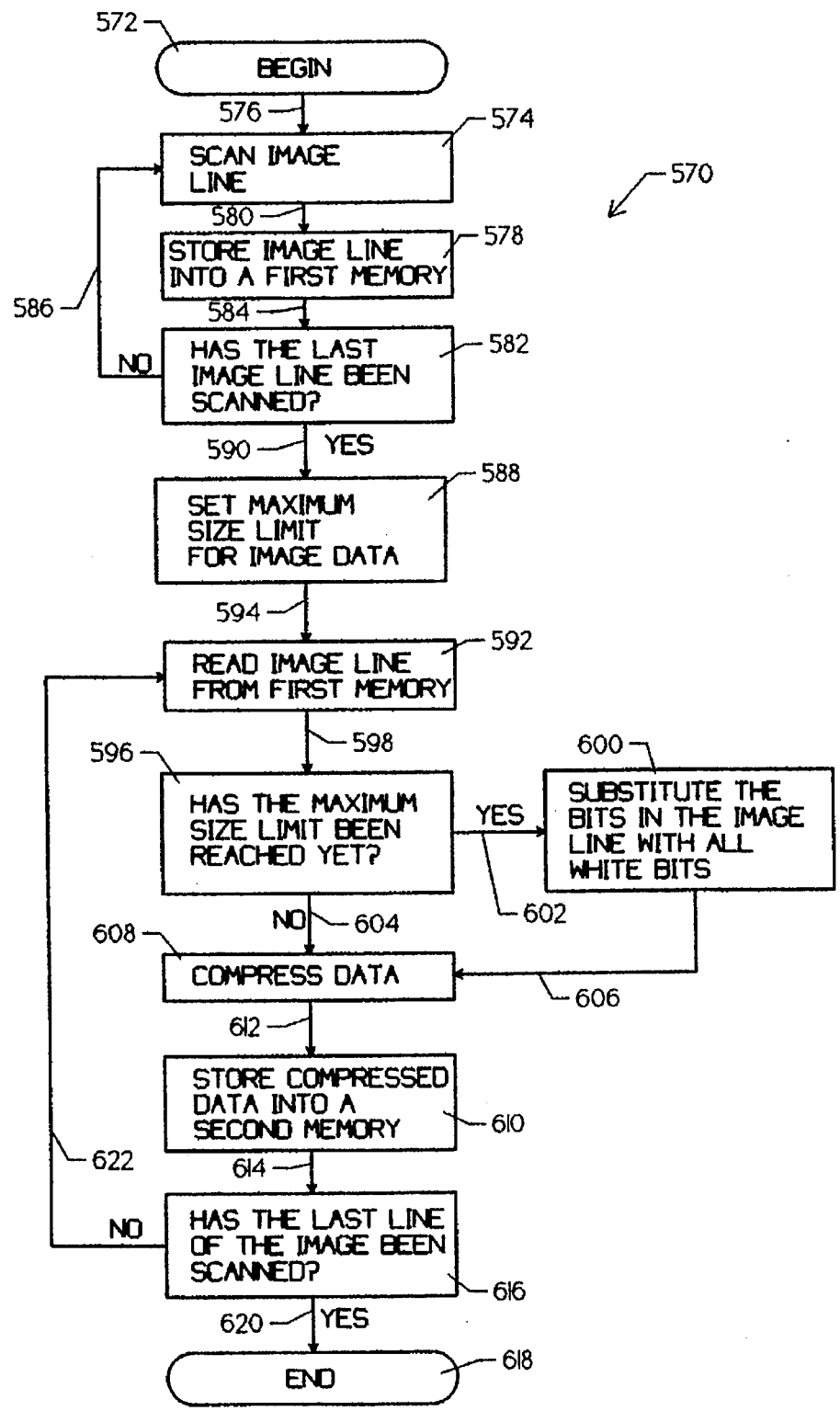
FIG. 17 is a flow diagram illustrating the operation of another preferred embodiment of the present invention.

FIG. 17 is a flow diagram illustrating the operation of another of the preferred embodiment of the present invention. This embodiment is generally shown at 570 and may be operated in a batch mode. The algorithm is entered at element 572 where control is passed to element 574 via interface 576. Element 574 scans in the first image line from a paper document. Control is then passed to element 578 via interface 580. Element 578 stores the image line scanned in by element 574 into a first memory. It is contemplated that the first memory may comprise a RAM, register file, magnetic tape medium, laser disk medium or any other electronic storage means. Control is then passed to element 582 via interface 584. Element 582 determines whether the last image line of the document has been scanned by element 574. If the last image line has not been scanned by element 574, control is passed back to element 574 via interface 586. The loop comprising elements 574, 578, and 582 is continued until the last image line of the document has been scanned by element 574 and stored in memory by element 578.

Control is then passed to element 588 via interface 590. It is recognized that a user may select when control is passed from element 582 to element 588. For example, a user may elect to pass control to element 588 at a predetermined time in a batch mode. Element 588 sets the maximum size limit for compressed image data. Control is then passed to element 592 via interface 594. Element 592 reads a line of image data from the first memory referred to in element 578. Control is then passed to element 596 via interface 598. Element 596 determines whether the maximum size limit for the compressed image data as set in element 588 has been reached. If the maximum size limit for the compressed data has been reached, control is passed to element 608 via interface 604. Element 608 compresses the image line that has been read from memory in element 592. In a preferred embodiment, element 608 compresses the image data in accordance with CCITT's Group-3 or Group-4 algorithms. Control is then passed to element 610 via interface 612. Element 610 stores the compressed image data into a second memory element. It is contemplated that the second memory element may comprise a RAM, register file, magnetic tape medium, laser disk medium, or any other electronic storage means. Control is then passed to element 616 via interface 614. Element 616 determines whether the last line of the image has been read from the first memory element in element 592. If the last line of the image data has been read by element 592, the algorithm is exited and control is passed to element 618 via interface 620. If the last line of the image has not been scanned by element 592, control is passed to element 592 via interface 622. Element 592 then scans in the next successive image line from the first memory element as referred to in element 578.

Referring back to element 596, if the maximum size limit of the compressed data as set by element 588 has been reached, control is passed to element 600 via interface 602. Element 600 substitutes the bits in the image line with all white bits in the preferred embodiment. However, it is recognized that element 600 may substitute the bits in the image line with all black bits. Control is then passed to element 608 via interface 606. Element 608 compresses the image line comprising all white bits in accordance with CCITT's Group-3 or Group-4 algorithms. Since the image line comprises all white bits, element 608 may substantially compress the remaining data in the image.

Figure 18:
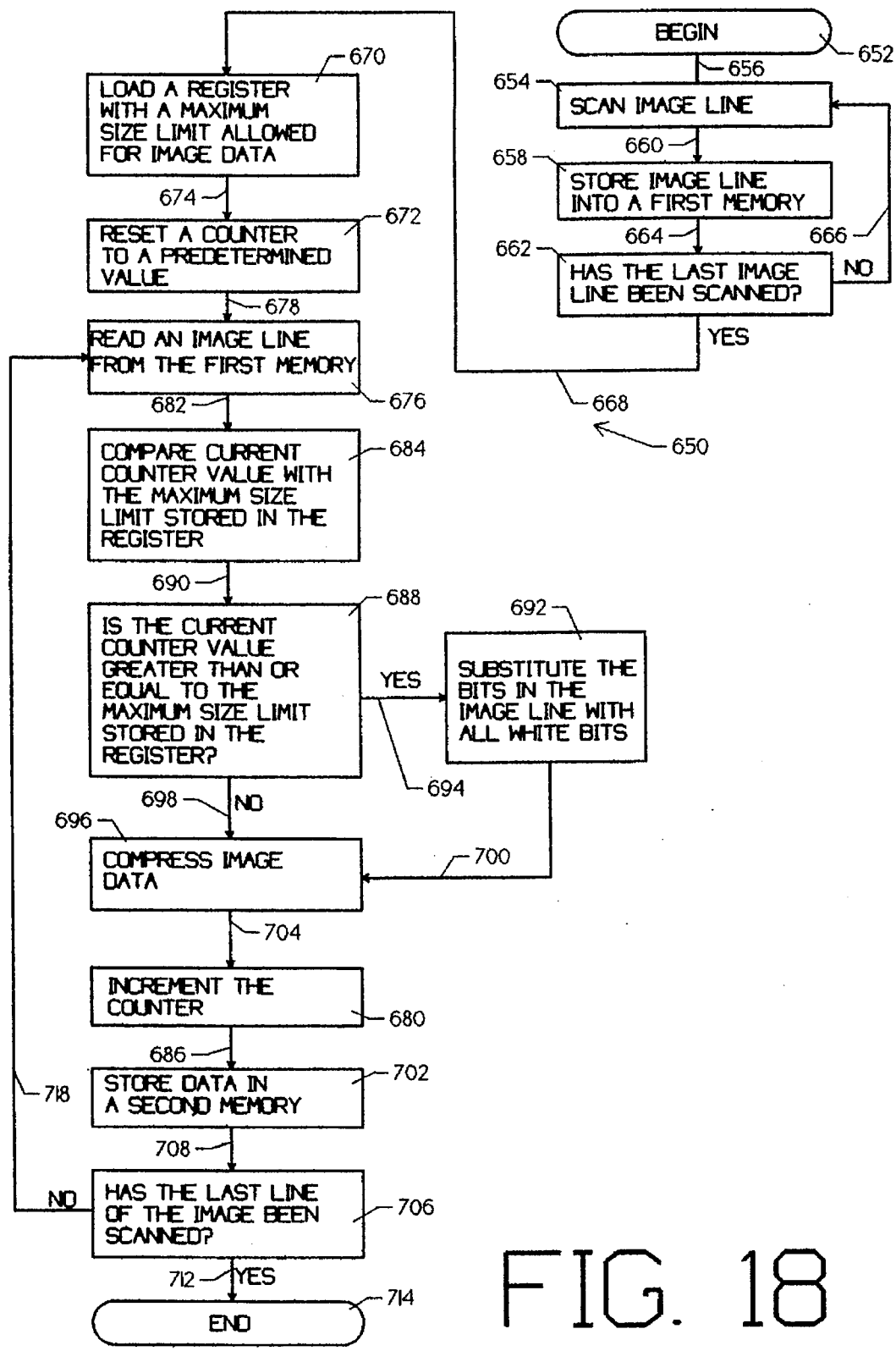
FIG. 18 is a detailed flow diagram illustrating the operation of the preferred embodiment of the present invention shown in FIG. 17.

FIG. 18 is a detailed flow diagram illustrating the operation of the preferred embodiment of the present invention shown in FIG. 17. The algorithm is entered at element 652 and control is passed to element 654 via interface 656. Element 654 scans in a first image line of a paper document. Control is then passed to element 658 via interface 660. Element 658 stores the image line scanned in by element 654 into a first memory. It is recognized that the first memory may comprise a RAM, register file, magnetic tape medium, laser disk medium, or any other electronic storage means. Control is then passed to element 662 via interface 664. Element 662 determines whether the last image line of the paper document has been scanned in by element 654. If the last image line has not been scanned in by element 654, control is passed back to element 654 via interface 666. Element 654 then scans in the next successive image line of the paper document. The loop comprising elements 654, 658 and 662 is continued until all lines of the paper document have been scanned in by element 654 and stored into the first memory by element 658. Control is then passed to block 670 via interface 668. It is recognized that a user may have the capability to specify when control is passed to element 670. For example, the user may be elect to have control passed from element 662 to element 670 at a predetermined later time in a batch mode. Element 670 loads a register with a maximum size limit allowed for compressed image data. Control is then passed to element 672 via interface 674. Element 672 resets a counter to a predetermined value. In a preferred embodiment of the present invention, the counter is reset to zero. Control is then passed to element 676 via interface 678. Element 676 reads an image line from the first memory. Control is then passed to element 684 via interface 682. Element 684 compares the current counter value with the maximum size limit stored in the register. Control is then passed to element 688 via interface 690. Element 688 determines whether the current counter value is greater than or equal to the maximum size limit stored in the register. If the current counter value is greater than or equal to the maximum size limit stored in the register, control is passed to element 696 via interface 698. Element 696 compresses the image line read in by element 676. In a preferred embodiment of the present invention, element 696 compresses the image line in accordance with CCITT's Group-3 or Group-4 algorithms. Control is then passed to element 680 via interface 704. Element 680 increments the counter for every byte of compressed data that is output by element 696. Control is then passed to element 702 via interface 686. Element 702 stores the compressed image line into a second memory. It is recognized that the second memory may comprise a RAM, register file, magnetic storage media, laser disk media, or any other electronic storage means. Control is then passed to element 706 via interface 708. Element 706 determines whether the last line of the image has been read from the first memory by element 676. If the last image line of the image has not been read by element 676, control is passed back to element 676 via interface 718. Element 676 then reads in the next successive image line from the first memory. If the last line of the image has been read by element 676, control is passed to element 714 and the algorithm is exited.

Referring back to element 688, if the current counter value is greater than or equal to the maximum size limit stored in the register, control is passed to element 692 via interface 694. This will only occur if the image is sufficiently busy such that the compressed image data cannot be stored into a memory size as specified by element 670. Element 692 substitutes the bits in the image line with all white bits in the preferred embodiment. However, it is recognized that element 692 may substitute the bits in the image line with all black bits or any other predetermined pattern. Control is then passed to element 696 via interface 700. Element 696 then compresses the image line comprising all white data. Since the entire image line comprises white bits, element 696 can substantially compress the remaining image data.

Having thus described the preferred embodiments of the present invention, those of skill in the art will readily appreciate that the teachings found herein may be applied to yet other embodiments within the scope of the claims hereto attached.

We claim:

1. In an image processing system for compressing a digitized image, the image processing system having a compressor for compressing the digitized image and for providing a compressed image thereof having a size, and a memory coupled to the compressor for storing the compressed image, the improvement comprising:
   a. truncating means coupled to the compressor for truncating the digitized image when the size of the compressed image reaches a predetermined memory size, the digitized image having a truncated portion, the compressed image having a plurality of bytes;
   b. substituting means coupled to said truncating means for substituting a predetermined pattern for the truncated portion of the digitized image and providing the predetermined pattern to the compressor in lieu of the truncated portion thereafter;

c. counting means coupled to the compressor for counting the number of bytes in the compressed image as the compressed image is provided by the compressor;

d. comparing means coupled to said counting means for comparing the number of bytes counted by said counting means with the predetermined memory size; and e. multiplexing means coupled to the scanner and the compressor for multiplexing the digitized image to the compressor when said comparing means determines that the number of bytes counted by said counting means does not exceed the predetermined memory size and for multiplexing the predetermined pattern to the compressor when said comparing means determines that the number of bytes counted by said counting means does exceed the predetermined memory size.

2. An improvement according to claim 1 wherein said predetermined memory size is stored in a register.

3. An improvement according to claim 2 wherein said predetermined pattern is an all ones pattern.

4. An improvement according to claim 2 wherein said predetermined pattern is an all zeros pattern.

5. An improvement according to claim 2 wherein the digitized image is compressed by the compressor in accordance with a CCITT compatible compression format.

6. An apparatus for compressing a digitized image, the apparatus having a compressor for compressing the digitized image and for providing a compressed image thereof having a size, and a memory coupled to the compressor for storing the compressed image, comprising:

a. a truncating circuit coupled to the compressor for truncating the digitized image when the size of the compressed image reaches a predetermined memory size, the digitized image having a truncated portion, the compressed image having a plurality of bytes;

b. a substituting circuit coupled to said truncating circuit for substituting a predetermined pattern for the truncated portion of the digitized image and providing the pattern to the compressor in lieu of the truncated portion thereafter;

c. a counter circuit coupled to the compressor for counting the number of bytes in the compressed image as the compressed image is provided by the compressor;

d. a comparator circuit coupled to said counting circuit for comparing the number of bytes counted by said counting circuit with the predetermined memory size; and e. a multiplexing circuit coupled to the scanner and the compressor for multiplexing the digitized image to the compressor when said comparing circuit determines that the number of bytes counted by said counting circuit does not exceed the predetermined memory size and for multiplexing the predetermined pattern to the compressor when said comparing circuit determines that the number of bytes counted by said counting circuit does exceed the predetermined memory size.

7. An apparatus according to claim 6 wherein said predetermined memory size is stored in a register.

8. An apparatus according to claim 7 wherein said predetermined pattern is an all ones pattern.

9. An apparatus according to claim 7 wherein said predetermined pattern is an all zeros pattern.

10. An apparatus according to claim 7 wherein the digitized image is compressed by the compressor in accordance with a CCITT compatible compression format.

11. An apparatus according to claim 7 wherein the digitized image can be compressed in real time.

12. An apparatus according to claim 7 wherein the digitized image can be compressed in a batch mode.

13. A method for compressing a digitized image resulting in a compressed image having a plurality of bytes such that the resulting compressed image may be stored in a memory of a predetermined size, comprising:

a. compressing the digitized image with a compressor;

b. counting the number of bytes in the resulting compressed image as the compressed image is provided by the compressor;

c. comparing the number of bytes counted in the resulting compressed image with the predetermined memory size to determine if the number of bytes counted exceeds the predetermined memory size;

d. truncating the digitized image if the comparing step (c) determines that the number of bytes counted exceeds the predetermined memory size; the digitized image having a truncated portion; and e. multiplexing a predetermined pattern to the compressor if the comparing step (c) determines that the number of bytes counted exceeds the predetermined memory size and providing the predetermined pattern to the compressor in lieu of the truncated portion thereafter.

14. A method for compressing a digitized image having a plurality of portions resulting in a compressed image having a plurality of bytes and having a plurality of portions such that the resulting compressed image may be stored in a memory having a predetermined size, comprising:

a. setting a maximum limit for the resulting compressed image;

b. reading a portion of the digitized image;

c. compressing the portion of the digitized image read in step (b) and producing a portion of the resulting compressed image;

d. storing the portion of the resulting compressed image into the memory;

e. counting the number of bytes in the resulting compressed image;

f. comparing the number of bytes counted in the resulting compressed image with the maximum size limit set in step (a) to determine if the number of bytes counted in the resulting compressed image exceeds the maximum size limit set in step (a);

g. truncating the digitized image if the comparing step (f) determines that the number of bytes counted exceeds the predetermined memory size; the digitized image having a truncated portion;

h. multiplexing a predetermined pattern to the compressor if the comparing step (f) determines that the number of bytes counted exceeds the predetermined memory size and providing the predetermined pattern to the compressor in lieu of the truncated portion thereafter;

i. multiplexing the digitized image to the compressor if the comparing step (f) determines that the number of bytes counted in the resulting compressed image does not exceed the predetermined memory size; and j. repeating steps (b)–(i) until all of the plurality of portions of the digitized image have been compressed.

15. An image processing apparatus comprising:

a. a video camera for scanning in an image of a document;

b. a digitizer coupled to said video camera for digitizing the image;

c. a multiplexer having a first input, a second input, a select line, and an output; the first input of said multiplexer being coupled to said digitizer, the second input of said multiplexer being coupled to a predetermined voltage; the select line of said multiplexer controlling when the first input of said multiplexer is selected and when the second input of said multiplexer is selected;

d. a compressor for compressing said image, said compressor having an input and an output, the input of said compressor being coupled to the output of said multiplexer; the compressor providing a compressed image having a plurality of bytes of data;

e. a counter coupled to the output of said compressor for counting the plurality of bytes in the compressed image; said counter having a counter value contained therein;

f. a register for storing a predetermined threshold;

g. a comparator coupled to said counter and said register for comparing the counter value with the predetermined threshold; said comparator having an output that is coupled to the select line of said multiplexer; said comparator changing the state of the select line of said multiplexer and thus causing said multiplexer to select the second input of said multiplexer if the counter value exceeds the predetermined threshold; and h. a memory coupled to said compressor for storing the resulting compressed image.

16. An image processing apparatus comprising:

a. a video camera for scanning in an image of a document;

b. a digitizer coupled to said video camera for digitizing the image;

c. an image storage memory coupled to said digitizer for storing the digitized image;

d. a multiplexer having a first input, a second input, a select line, and an output; the first input of said multiplexer being coupled to said image storage memory, the second input of said multiplexer being coupled a predetermined voltage; the select line of said multiplexer controlling when the first input of said multiplexer is selected and when the second input of said multiplexer is selected;

e. a compressor for compressing said image, said compressor having an input and an output, the input of said compressor being coupled to the output of said multiplexer; the compressor providing a compressed image having a plurality of bytes of data;

f. a counter coupled to the output of said compressor for counting the plurality of bytes in the compressed image; said counter having a counter value contained therein;

g. a register for storing a predetermined threshold;

h. a comparator coupled to said counter and said register for comparing the counter value with the predetermined threshold; said comparator having an output that is coupled to the select line of said multiplexer; said comparator changing the state of the select line of said multiplexer and thus causing said multiplexer to select the second input of said multiplexer if the counter value exceeds the predetermined threshold; and i. a memory coupled to said compressor for storing the resulting compressed image.

17. In an image processing system for compressing a digitized image, the image processing system having a compressor for compressing the digitized image and for providing a compressed image thereof having a size, and a memory coupled to the compressor for storing the compressed image, the improvement comprising:

a. truncating means coupled to the compressor for truncating the digitized image when the size of the compressed image reaches a predetermined memory size, the digitized image having a truncated portion, the compressed image being comprised of a plurality of bytes;

b. substituting means coupled to said truncating means for substituting a predetermined pattern for the truncated portion of the digitized image and providing the predetermined pattern to the compressor in lieu of the truncated portion thereafter;

c. truncating means comprised of counting means coupled to the compressor for counting the number of bytes in the compressed image as the compressed image is provided by the compressor;

d. truncating means further comprised of comparing means coupled to said counting means for comparing the number of bytes counted by said counting means with the predetermined memory size; and e. substituting means comprised of multiplexing means coupled to the scanner and the compressor for multiplexing the digitized image to the compressor when said comparing means determines that the number of bytes counted by said counting means does not exceed the predetermined memory size and for multiplexing the predetermined pattern to the compressor when said comparing means determines that the number of bytes counted by said counting means does exceed the predetermined memory size, said predetermined memory size being stored in a register, said predetermined pattern being comprised of an all zeros or all ones pattern, said digitized image being compressed by the compressor in accordance with a CCITT compatible compression format.

18. An apparatus for compressing a digitized image, the apparatus having a compressor for compressing the digitized image and for providing a compressed image thereof having a size, and a memory coupled to the compressor for storing the compressed image, comprising:

a. a truncating circuit coupled to the compressor for truncating the digitized image when the size of the compressed image reaches a predetermined memory size, the digitized image having a truncated portion, the compressed image being comprised of a plurality of bytes;

b. a substituting circuit coupled to said truncating circuit for substituting a predetermined pattern for the truncated portion of the digitized image and providing the pattern to the compressor in lieu of the truncated portion thereafter;

c. truncating circuit comprised of counting circuit coupled to the compressor for counting the number of bytes in the compressed image as the compressed image is provided by the compressor;

d. truncating circuit further comprised of comparator circuit coupled to said counting circuit for comparing the number of bytes counted by said counting circuit with the predetermined memory size; and e. substituting circuit comprised of multiplexing circuit coupled to the scanner and the compressor for multiplexing the digitized image to the compressor when said comparing circuit determines that the number of bytes counted by said counting circuit does not exceed the predetermined memory size and for multiplexing the predetermined pattern to the compressor when said comparing circuit determines that the number of bytes counted by said counting circuit does exceed the predetermined memory size, said predetermined memory size being stored in a register, said predetermined pattern being comprised of an all zeros or all ones pattern, said digitized image being compressed by the compressor in accordance with a CCITT compatible compression format.

* * * * *